US012535630B2

(12) United States Patent
Acharya et al.

(10) Patent No.: US 12,535,630 B2
(45) Date of Patent: Jan. 27, 2026

(54) OPTICAL FILM, OPTICAL CONSTRUCTION, AND DISPLAY SYSTEM

(71) Applicant: 3M INNOVATIVE PROPERTIES COMPANY, St. Paul, MN (US)

(72) Inventors: Bharat R. Acharya, Woodbury, MN (US); Brett J. Sitter, Marine on St Croix, MN (US); Robert D. Taylor, Stacy, MN (US); Zhicheng Tian, Woodbury, MN (US); James P. DiZio, St. Paul, MN (US); Quinn D. Sanford, Mosinee, WI (US); Kent C. Hackbarth, River Falls, WI (US); Matthew E. Sousa, Rosemount, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 429 days.

(21) Appl. No.: 18/038,292

(22) PCT Filed: Nov. 2, 2021

(86) PCT No.: PCT/IB2021/060142
§ 371 (c)(1),
(2) Date: May 23, 2023

(87) PCT Pub. No.: WO2022/123345
PCT Pub. Date: Jun. 16, 2022

(65) Prior Publication Data
US 2024/0053522 A1    Feb. 15, 2024

Related U.S. Application Data

(60) Provisional application No. 63/199,089, filed on Dec. 7, 2020.

(51) Int. Cl.
*G02B 5/30* (2006.01)
*G02B 1/04* (2006.01)
(Continued)

(52) U.S. Cl.
CPC ............... *G02B 5/305* (2013.01); *G02B 1/04* (2013.01); *G02B 5/26* (2013.01); *G06V 40/13* (2022.01)

(58) Field of Classification Search
CPC . G02B 5/305; G02B 5/26; G02B 5/30; G02B 5/3025; G02B 5/3033;
(Continued)

(56) References Cited

U.S. PATENT DOCUMENTS 8,765,881 B2   7/2014   Hays et al.
9,417,364 B2   8/2016   Nakamura et al.
(Continued)

FOREIGN PATENT DOCUMENTS

CN   111095289 A   5/2020
EP   0835294 B1   1/2003
(Continued)

OTHER PUBLICATIONS

International Search report for PCT International Application No. PCT/IB2021/060142, mailed on Feb. 14, 2022, 3 pages.

*Primary Examiner* — Stephone B Allen
*Assistant Examiner* — Adam W Booher
(74) *Attorney, Agent, or Firm* — Christopher P. Tebow

(57) ABSTRACT

An optical construction includes a reflective polarizer and an optical film. The optical film includes a matrix and a plurality of first particles dispersed in the matrix. Each of the matrix and the plurality of first particles includes a silicone polyoxamide and an acrylate polymer. For substantially normally incident light and for at least a first wavelength in a first wavelength range, the reflective polarizer reflects (Continued)

about 60% for a first polarization state and transmits about 40% for an orthogonal second polarization state. For at least a second wavelength in a second wavelength range, each of the reflective polarizer and the optical film transmits about 60% of an incident light for each of the first and second polarization states. For at least the first wavelength, optical film has an optical haze and a depolarization ratio. A ratio of the depolarization ratio to the optical haze is less than 0.1.

7 Claims, 13 Drawing Sheets

(51) Int. Cl.
  *G02B 5/26* (2006.01)
  *G06V 40/13* (2022.01)
(58) Field of Classification Search
  CPC ...... G02B 5/3041; G02B 5/02; G02B 5/0205; G02B 5/021; G02B 5/0226; G02B 5/0236; G02B 5/0242; G02B 5/0268; G02B 5/0278; G02B 5/0294; G02B 1/04; G60V 40/13; G06F 21/32
  See application file for complete search history.

(56) References Cited

U.S. PATENT DOCUMENTS

| 2010/0068421 A1 | 3/2010 | Tse et al. |
| 2011/0116167 A1 | 5/2011 | Greener et al. |
| 2013/0182324 A1 | 7/2013 | Inui et al. |
| 2013/0202867 A1 | 8/2013 | Coggio et al. |
| 2015/0132567 A1 | 5/2015 | Shimokuri et al. |

FOREIGN PATENT DOCUMENTS

| JP | 2007178792 A | 7/2007 |
| KR | 10-1269720 B1 | 5/2013 |
| WO | 2011028373 A1 | 3/2011 |
| WO | 2014028529 A2 | 2/2014 |
| WO | 2018163009 A1 | 9/2018 |
| WO | 2020155158 A1 | 8/2020 |
| WO | 2021224703 A1 | 11/2021 |

OPTICAL FILM, OPTICAL CONSTRUCTION, AND DISPLAY SYSTEM

CROSS REFERENCE TO RELATED APPLICATIONS

This application is a national stage filing under 35 U.S.C. 371 of PCT/IB2021/060142, filed Nov. 2, 2021, which claims the benefit of Provisional U.S. Application No. 63/199,089, filed Dec. 7, 2020, the disclosure of which is incorporated by reference in its/their entirety herein.

TECHNICAL FIELD

The present disclosure relates generally to an optical film, an optical construction including the optical film, and a display system including the optical film.

BACKGROUND

Electronic devices, such as smart phones, tablet computers, personal computers, music players, or navigators, can be equipped with biometric authentication features, such as fingerprint sensors. In some cases, the fingerprint sensors are incorporated under a display of the electronic devices, and are referred to as under-the-display fingerprint sensors. The under-the-display fingerprint sensors turn a defined area of the fully functional display into a fingerprint sensor, thereby eliminating the need for a separate physical fingerprint sensor.

SUMMARY

In a first aspect, the present disclosure provides an optical construction. The optical construction includes a reflective polarizer having a first major surface and a second major surface opposite to the first major surface. The optical construction further includes an optical film disposed on the first major surface of the reflective polarizer. The optical film includes a matrix and a plurality of first particles dispersed in the matrix. Each of the matrix and the plurality of first particles includes a silicone polyoxamide and an acrylate polymer. For substantially normally incident light and for at least a first wavelength in a first wavelength range from about 400 nanometers (nm) to about 700 nm, the reflective polarizer reflects at least about 60% of the normally incident light for a first polarization state and transmits at least about 40% of the normally incident light for an orthogonal second polarization state. For at least a second wavelength in a second wavelength range from about 800 nm to about 1500 nm, each of the reflective polarizer and the optical film transmits at least about 60% of an incident light for each of the first polarization state and the second polarization state. For at least the first wavelength, the optical film has an optical haze and a depolarization ratio. A ratio of the depolarization ratio to the optical haze is less than about 0.1.

In a second aspect, the present disclosure provides another optical construction. The optical construction includes a reflective polarizer having a first major surface and a second major surface opposite to the first major surface. The optical construction further includes an optical film disposed on the first major surface of the reflective polarizer. The optical film includes a matrix and a plurality of first particles dispersed in the matrix. Each of the matrix and the plurality of first particles includes a silicone polyoxamide and an acrylate polymer. For substantially normally incident light and for a first wavelength range from about 400 nm to about 700 nm, the reflective polarizer has an average optical reflectance of at least about 60% for a first polarization state and an average optical transmittance of at least about 40% for an orthogonal second polarization state. For a second wavelength range from about 800 nm to about 1500 nm, the reflective polarizer and the optical film, in combination, have an average optical transmittance of at least about 60% for each of the first polarization state and the second polarization state. For the first wavelength range, the optical film has an average optical haze and an average depolarization ratio. A ratio of the average depolarization ratio to the average optical haze is less than about 0.1.

In a third aspect, the present disclosure provides a display system. The display system includes a reflective polarizer having a first major surface and a second major surface opposite to the first major surface. The display system further includes an optical film disposed on the first major surface of the reflective polarizer. The optical film includes a matrix and a plurality of first particles dispersed in the matrix. Each of the matrix and the plurality of first particles includes a silicone polyoxamide and an acrylate polymer. The display system further includes an optical diffuser disposed adjacent to the second major surface of the reflective polarizer. For substantially normally incident light and for at least a first wavelength in a first wavelength range from about 400 nm to about 700 nm, the reflective polarizer reflects at least about 60% of the normally incident light for a first polarization state and transmits at least about 40% of the normally incident light for an orthogonal second polarization state. For at least a second wavelength in a second wavelength range from about 800 nm to about 1500 nm, each of the reflective polarizer and the optical film transmits at least about 60% of an incident light for each of the first polarization state and the second polarization state. For at least the first wavelength, the optical diffuser is configured to emit a scattered light. The reflective polarizer is configured to receive the scattered light and transmit at least a portion of the scattered light as a transmitted polarized light. The optical film is configured to receive and transmit the transmitted polarized light as a diffused polarized light having an optical haze and a depolarization ratio. A ratio of the depolarization ratio to the optical haze is less than about 0.1.

In a fourth aspect, the present disclosure provides an optical film. The optical film includes a matrix and a plurality of first particles dispersed in the matrix. Each of the matrix and the plurality of first particles includes a silicone polyoxamide and an acrylate polymer. The first particles include more silicon than the matrix, and the matrix includes more carbon than the first particles. In a cross-section of the optical film, the first particles have a maximum first dimension along a first direction and a maximum second dimension along an orthogonal second direction. The maximum first dimension is greater than the maximum second dimension by at least 10%.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
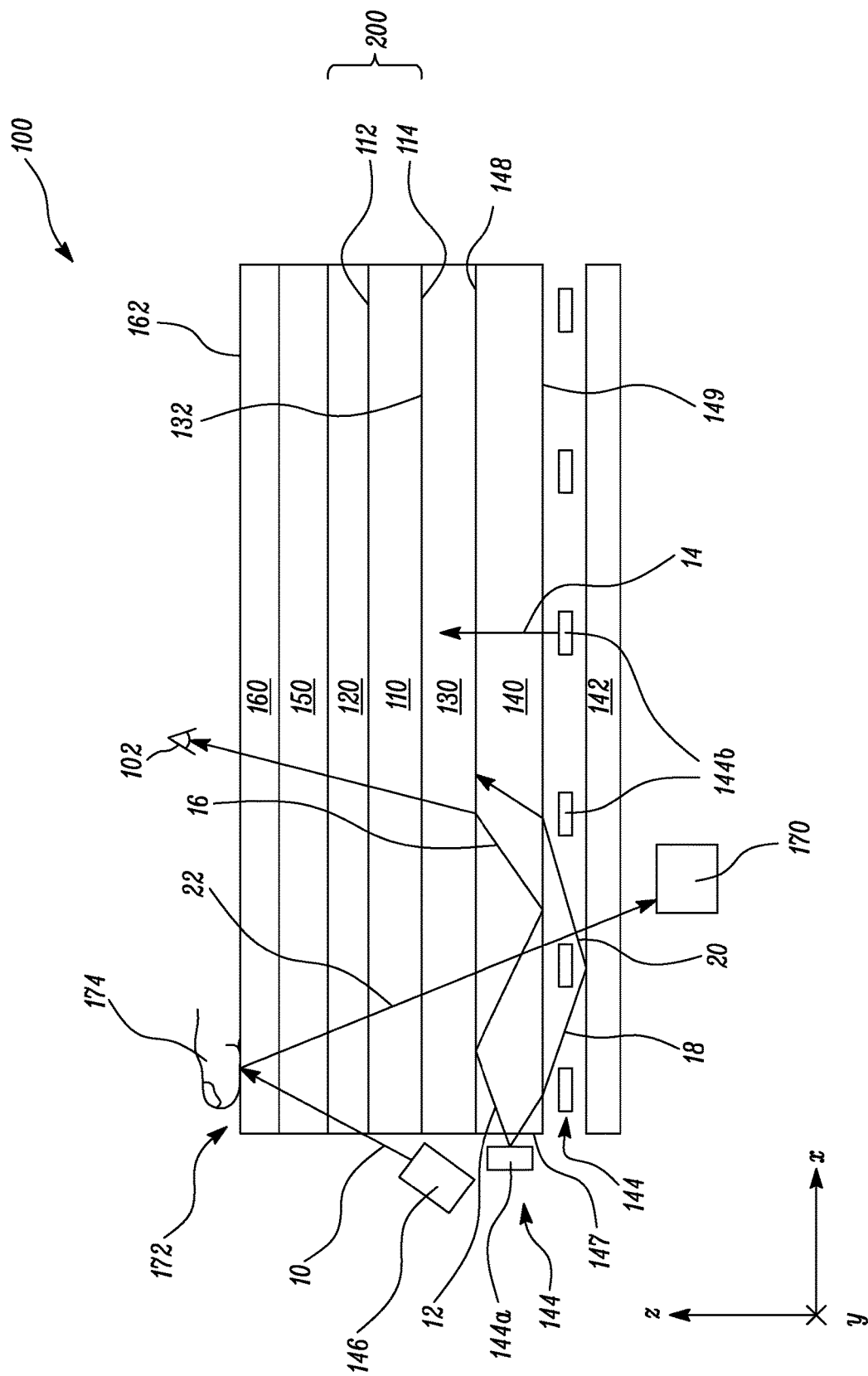
FIG. 1 illustrates a schematic view of a display system, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

As used herein, the term "film" generally refers to a material with a very high ratio of length or width to thickness. A film has two major surfaces defined by a length and width. Films typically have good flexibility and can be used for a wide variety of applications, including displays. Films may also be of thickness or material composition, such that they are semi-rigid or rigid. Films described in the present disclosure may be composed of various polymeric materials. Films may be monolayer or multilayer or blend of different polymers.

As used herein, the term "optical film" generally refers to a film that can be used to produce an optical effect. Optical films are typically at least partially transmissive, reflective, antireflective, polarizing, optically clear, and/or diffusive with respect to some wavelengths of the electromagnetic spectrum (e.g., wavelengths in the visible, ultraviolet, or infrared regions of the electromagnetic spectrum).

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

As used herein, the term "adhesive" generally refers to polymeric compositions useful to adhere together two adherends. Adhesives can be activatable by pressure, heat, or combinations thereof. Suitable adhesives may include those based on acrylates, rubber resin, urethanes, or combinations thereof.

As used herein, the term "optical haze" generally refers to a ratio of visible light transmitted through a sample that deviates from a normal direction by more than 4 degrees to a total transmitted light. Optical haze values can be measured, for instance, using a Haze-guard Plus haze meter (available from BYK-Gardiner, Silver Springs, MD.) according to the procedure described in ASTM D1003. Optical haze may occur when light passing through a material interacts with and/or is affected by irregularities in the material (e.g., suspended particles, contaminants, voids, and/or air spaces). Optical haze may indicate a degree of wide angle scattering of light passing through the material.

As used herein, the term "depolarization" generally refers to scrambling of polarization of incident light by a material. An ideal depolarizer would output randomly polarized light irrespective of the polarization of incident light.

As used herein, the term "depolarization ratio" generally relates to a deviation of a polarization state of a transmitted light from a polarization state of an incident light. A greater value of the depolarization ratio may indicate a greater deviation of the polarization state of the transmitted light from the polarization state of the incident light, and vice versa.

As used herein, the term "specularly transmitted light" generally refers to light transmitted without substantial deviation from its incident path. As used herein, the terms "diffused light", "diffused transmitted light", or "diffusedly transmitted light" generally refers to light transmitted with considerable scattering. By way of example and not of limitation, specularly transmitted light may refer to light transmitted within a cone around its incident path with cone angle of about 8 degrees or less, while diffused light may refer to light transmitted outside a cone around its incident path with cone angle of about 8 degrees or less.

As used herein, the term "scattering ratio" is generally defined as a ratio of a diffused light intensity to a total transmitted light intensity. Specifically, scattering ratio corresponding to a component/film/layer may be a ratio of an intensity of diffused light transmitted by a component/film/layer to an intensity of total light transmitted by the component/film/layer. Total light intensity may include both diffused light intensity and specularly transmitted light intensity transmitted by the component/film/layer.

As used herein, the term "atomic ratio" generally refers to a ratio of a number of atoms of a chemical element to a total number of atoms in one mole of a substance including the chemical element.

The present disclosure relates to an optical construction. The optical construction may be used in electronic devices that include displays, such as computer monitors, televisions, mobile phones, personal digital assistants (PDAs), wearable devices and other portable devices. Such electronic devices may be equipped with biometric authentication features, for example, fingerprint sensors. In some cases, the optical construction may be incorporated in a backlight unit of a liquid crystal display (LCD) system.

The optical construction includes a reflective polarizer having a first major surface and a second major surface opposite to the first major surface. The optical construction further includes an optical film disposed on the first major surface of the reflective polarizer. The optical film includes a matrix and a plurality of first particles dispersed in the matrix. Each of the matrix and the plurality of first particles includes a silicone polyoxamide and an acrylate polymer. For substantially normally incident light and for at least a first wavelength in a first wavelength range from about 400 nanometers (nm) to about 700 nm, the reflective polarizer reflects at least about 60% of the normally incident light for a first polarization state and transmits at least about 40% of the normally incident light for an orthogonal second polarization state. For at least a second wavelength in a second wavelength range from about 800 nm to about 1500 nm, each of the reflective polarizer and the optical film transmits at least about 60% of an incident light for each of the first polarization state and the second polarization state. For at least the first wavelength, the optical film has an optical haze and a depolarization ratio. A ratio of the depolarization ratio to the optical haze is less than about 0.1.

In some cases, the first wavelength range may correspond to visible wavelength range, while the second wavelength range may correspond to an infrared (IR) wavelength range. The first polarization state may be orthogonal to a pass axis of the reflective polarizer while the second polarization state may be parallel to the pass axis of the reflective polarizer.

The present disclosure also relates to a display system including the reflective polarizer and the optical film. The display system may further include an optical diffuser disposed adjacent to the second major surface of the reflective polarizer. The display system may further include an absorbing polarizer disposed adjacent to the optical film opposite to the reflective polarizer. The display system may further include a display panel disposed adjacent to the absorbing polarizer opposite to the optical film.

Fingerprint sensing is generally performed by using capacitive sensors. In order to reduce or eliminate bezel of displays, fingerprint sensing can be performed using infrared light and infrared sensors. Such infrared sensors are generally disposed below the backlight units of liquid crystal display (LCD) panels. Conventional backlight units generally include one or more prism layers for collimating light. However, the prism layers may also refract infrared light used for fingerprint sensing. For example, the prism layers may split an original image of a fingerprint into multiple images, thereby reducing an accuracy of fingerprint sensing and identification.

Some conventional backlight units may replace the prism layers with a collimating film that is substantially transparent to infrared light. The collimating film typically acts as a reflecting polarizer, but reflects light at high incidence angles. However, a high reflectivity of the collimating film in the visible wavelength range may result in optical artifacts, such as reflective moiré. For example, the collimating film may generate reflected images of electrodes used for displaying information in the LCD panel. Interference between the electrodes and their reflected images may cause reflective moiré. Optical artifacts, such as reflective moiré, may adversely impact a quality of a displayed image.

Conventional methods to reduce such optical artifacts may include providing an optical haze between the reflective polarizer and the LCD panel. The optical haze may be provided by various methods, such as diffusive adhesives, diffusive polarizers, anti-glare polarizers, and so forth. However, these methods may scramble or change a polarization of light exiting the collimating film resulting in a depolarized light. The depolarized light is incident on an absorbing polarizer that is typically provided between the collimating film and the LCD panel. The absorbing polarizer absorbs a component of the depolarized light that is orthogonal to a pass axis of the absorbing polarizer, thereby reducing an overall brightness of the LCD panel. To address the reduction in brightness, an additional component, such as an additional reflecting polarizing film, may have to be provided between the collimating film and the absorbing polarizer. This may increase a thickness and a cost of conventional display stacks.

The optical film of the present disclosure includes the plurality of first particles dispersed in the matrix. The first particles may scatter incident light in the first wavelength range, thereby producing the optical haze. The optical haze may be sufficient to reduce optical artifacts, such as reflective moiré. The optical film may further scatter incident light with a low value of the depolarization ratio. Therefore, the ratio of the depolarization ratio to the optical haze is less than about 0.1. The depolarization ratio of the optical film in the first wavelength range may be significantly lower as compared to conventional diffusive coatings or films.

Due to the low value of the depolarization ratio, a polarization state of a scattered light exiting the optical film is substantially preserved. The absorbing polarizer receiving the scattered light from the optical film may therefore substantially transmit the scattered light with minimal absorption. As a result, the optical haze of the optical film may have minimal or no impact on an overall brightness of the display panel. Thus, the optical film of the present disclosure may eliminate the need for additional polarizing films between the optical film and the absorbing polarizer. The display system including the optical film may therefore have reduced thickness and cost.

Further, in the second wavelength range, each of the reflective polarizer and the optical film transmits at least about 60% of the incident light for each of the first polarization state and the second polarization state. In some embodiments, the reflective polarizer and the optical film, in combination, transmits at least about 60% of the incident light for each of the first polarization state and the second polarization state. Therefore, each of the reflective polarizer and the optical film may allow substantially specular transmission of IR light. Specifically, each of the reflective polarizer and the optical film may be substantially transparent to IR light. Thus, the optical film of the present disclosure may be substantially transparent to IR light, and may scatter incident light in the visible wavelength range with an optical haze sufficient to eliminate optical artifacts (such as, reflective moiré), but with a low depolarization ratio.

FIG. 1 illustrates a schematic view of a display system 100 according to an embodiment of the present disclosure. Specifically, FIG. 1 shows a sectional side view of the display system 100. The display system 100 may be configured to display content, such as text and/or graphics.

The display system 100 defines mutually orthogonal x, y, and z-axes. The x and y-axes are in-plane axes of the display system 100, while the z-axis is a transverse axis disposed along a thickness of the display system 100. In other words, the x and y-axes are disposed along a plane of the display system 100, while the z-axis is perpendicular to the plane of the display system 100.

The display system 100 includes a reflective polarizer 110 having a first major surface 112 and a second major surface 114 opposite to the first major surface 112. The display system 100 further includes an optical film 120 disposed on the first major surface 112 of the reflective polarizer 110. In some embodiments, each of first major surface 112 and the second major surface 114 may be substantially planar. Further, the first and second major surfaces 112, 114 are substantially disposed along the x-y plane. The reflective polarizer 110 may substantially allow light of a specific polarization to pass through while substantially blocking light of orthogonal polarizations. In some embodiments, the reflective polarizer 110 may reflect light incident at higher angles with respect to the second major surface 114. The reflective polarizer 110 and the optical film 120 constitute an optical construction 200.

The display system 100 further includes an optical diffuser 130 disposed adjacent to the second major surface 114 of the reflective polarizer 110. The optical diffuser 130 is configured to scatter light. In some embodiments, the optical diffuser 130 may include a diffuser film or plate made of any suitable diffusing material(s). In some embodiments, the optical diffuser 130 can include any one of the optical diffusers described in PCT Patent Application No. PCT/CN2019/074629, the disclosure of which is incorporated herein in its entirety by reference. In some embodiments, the optical diffuser 130 includes a plurality of nanoparticles bonded to each other by a polymeric material. The nanoparticles can be or include silica.

In some embodiments, the optical diffuser 130 and the reflective polarizer 110 may be bonded together, for example, by means of an optical adhesive, epoxy, lamination, or any other suitable method of attachment. In some embodiments, the optical diffuser 130 may be coated directly on the reflective polarizer 110 by using processes known in the art, such as die coating, slot coating, extrusion coating, etc.

The display system 100 further includes a lightguide 140 disposed adjacent to the optical diffuser 130 opposite to the reflective polarizer 110. In some embodiments, the lightguide 140 may be a clear, solid, and relatively thin plate whose length and width dimensions are designed based on a coverage of light output from the display system 100. In some embodiments, the lightguide 140 may be formed from a polymerizable material, such as acrylate, silicone, or urethane material. In some embodiments, the lightguide 140 may be made of an optically transparent material. A length of the lightguide 140 may be defined along the x-axis, while a width of the lightguide 140 may be defined along the y-axis.

In some embodiments, the lightguide 140 and the optical diffuser 130 may be bonded together, for example, by means of an optical adhesive, epoxy, lamination, or any other suitable method of attachment.

The display system 100 further includes at least one first light source 144 configured to emit light in a first wavelength range R1 and at least one second light source 146 configured to emit light in a second wavelength range R2. In some embodiments, the first wavelength range R1 may correspond to a visible wavelength range. In some embodiments, the first wavelength range R1 is from about 400 nm to about 700 nm. In some embodiments, the at least one first light source 144 may be a visible light source. In some embodiments, the second wavelength range R2 may correspond to near infrared (IR) wavelength range. In some embodiments, the second wavelength range R2 is from about 800 nm to about 1500 nm. In some other embodiments, the second wavelength range R2 is from about 800 nm to about 2000 nm. In some other embodiments, the second wavelength range R2 is from about 800 nm to about 1000 nm. In some embodiments, the at least one second light source 146 may be an infrared light source. The at least one first light source 144 may be hereinafter interchangeably referred to as "the first light source 144". The at least one second light source 146 may be hereinafter interchangeably referred to as "the second light source 146".

In some embodiments, the first light source 144 may include one or more light emitters which emit visible light. The light emitters may be, for example, light emitting diodes (LEDs), fluorescent lights, or any other suitable light emitting devices. The LEDs may be monochromatic or may include a number of emitters operating at different wavelengths in order to produce a white light output. In some embodiments, the second light source 146 may include a light emitting diode or a laser diode.

The first light source 144 generates light 12 and/or light 14 that illuminates the display system 100. The first light source 144 is configured to emit the light 12 and/or the light 14 over an emission surface 148 of the lightguide 140. The emission surface 148 of the lightguide 140 faces the optical diffuser 130. In some embodiments, the lightguide 140 may be configured to propagate the light 12 therein along the length and the width of the lightguide 140.

In the illustrated embodiment of FIG. 1, the first light source 144 includes one or more first light sources 144a and one or more first light sources 144b. The first light source 144a is configured to emit the light 12 in the first wavelength range R1. The first light source 144b is configured to emit the light 14 in the first wavelength range R1. The first light source 144 may include any number of light sources. Further, any number of the first light sources 144a, 144b may be provided. In some examples, the at least one second light source 146 may include multiple light sources. In the illustrated example of FIG. 1, the first light source 144a and the second light source 146 are disposed in an edge-lit configuration proximal to an edge surface 147 of the display system 100. Further, each first light source 144b is disposed in a back-lit configuration proximal to a bottom side 149 of the lightguide 140 opposite to the emission surface 148. In some embodiments, only one of the first light source 144a and the first light source 144b may be present.

The light 14 from the first light source 144b propagates through the lightguide 140 toward the optical diffuser 130. Further, the lightguide 140 guides the light 12 from the first light source 144a and directs light 16 toward the optical diffuser 130. In some embodiments, the lightguide 140 may be a plate having multiple structures for guiding the light 12. In some embodiments, the lightguide 140 may use total internal reflection (TIR) to transport or guide the light 12 across the entire length or width of the lightguide 140 from the first light source 144a that is located proximal to the edge surface 147 of the display system 100. In some cases, the lightguide 140 may improve uniformity of light emitted by the display system 100.

The display system 100 further includes a reflector 142 disposed adjacent to the lightguide 140 and opposite to the optical diffuser 130. The reflector 142 is configured to substantially reflect light in the first wavelength range R1 (i.e., visible light) and substantially transmit light in the second wavelength range R2 (i.e., IR light). As shown in FIG. 1, the reflector 142 reflects light 18 that exits the lightguide 140 back toward the lightguide 140. The light 18 is emitted by the first light source 144a. Reflected light 20 from the reflector 142 propagates toward the emission surface 148.

In some embodiments, the lightguide 140 and the reflector 142 may be bonded together, for example, by means of an optical adhesive, epoxy, lamination, or any other suitable method of attachment.

In some embodiments, the reflector 142 may also be useful for recycling light within the display system 100. For example, the reflector 142 may reflect unused light back to the various layers of the display system 100. Thus, the reflector 142 recycles light generated by the first light source 144. This may result in improved light use efficiency and increased brightness. The reflector 142 may be a specular reflector or a diffuse reflector. In some embodiments, the reflector 142 may be an Enhanced Diffuse Reflector (EDR) film produced by the 3M Company. The reflector 142 may include a reflecting surface (e.g., a metallic surface, one or more of perforated mirrors, etc.) or may have a multi-layer configuration (e.g., micro-structured films).

In some embodiments, for an incident light of any polarization in the first wavelength range R1, the reflector 142 may have an optical reflectance of at least 80%, at least 90%, at least 95%, at least 98%, or at least 99%. The optical reflectance of the reflector 142 may be an average optical reflectance in the first wavelength range R1 for substantially normally incident light. In some embodiments, for an incident light of any polarization in the second wavelength range R2, the reflector 142 may have an optical transmittance of at least 80%, at least 90%, at least 95%, at least 98%, or at least 99%. The optical transmittance of the reflector 142 may be an average optical transmittance in the second wavelength range R2 for substantially normally incident light In some embodiments, the display system 100 further includes an absorbing polarizer 150 disposed adjacent to the optical film 120 opposite to the reflective polarizer 110. In some embodiments, the absorbing polarizer 150 may substantially transmit light of a specific polarization state while substantially absorbing light of other polarization states. The display system 100 further includes a display panel 160 disposed adjacent to the absorbing polarizer 150 opposite to the optical film 120. The display panel 160 may receive illumination from the first light source 144. In some embodiments, the optical diffuser 130 may scatter light received from the lightguide 140 for illuminating the display panel 160. Thus, the optical diffuser 130 may provide substantially uniform distribution of light to the display panel 160. A user 102 may face a top surface 162 of the display panel 160.

In some embodiments, the display panel 160 may selectively transmit or block light to form an image on the display panel 160 for viewing by the user 102. In some embodiments, the display panel 160 may be a liquid crystal display, although any appropriate type of display or light modulation device may be used. In some embodiments, the display panel 160 may include an organic light emitting diode (OLED) display, an active matrix organic light emitting diode (AMOLED) display, or an electroluminescent display. In some embodiments, the display panel 160 may include a plurality of individually addressable pixels (not shown). In some embodiments, the display panel 160 may be, partly or entirely, a touch sensitive display panel configured to receive contact inputs from the user 102. Accordingly, the display system 100 may receive touch inputs from the user 102. It should be understood that the display panel 160 may include in any type of display without limiting the scope of the present disclosure.

As shown in FIG. 1, the reflector 142, the lightguide 140, the optical diffuser 130, the reflective polarizer 110, the optical film 120, the absorbing polarizer 150, and the display panel 160 are disposed adjacent to each other along the z-axis. In some embodiments, each of the reflector 142, the lightguide 140, the optical diffuser 130, the reflective polarizer 110, the optical film 120, the absorbing polarizer 150, and the display panel 160 may substantially transmit light in the second wavelength range R2 (i.e., IR light). In other words, the display system 100 may exhibit infrared clarity.

The optical diffuser 130 faces the display panel 160 and includes an emission surface 132. In some embodiments, the optical diffuser 130 may be used to diffuse the lights 14, 16, 20 emitted by the first light source 144. This may increase a uniformity of illumination light incident on the display panel 160. Consequently, the image perceived by the user 102 may be uniformly bright. In some embodiments, the optical diffuser 130 may include an adhesive layer. In some embodiments, the optical diffuser 130 may scramble a polarization of an incident light. This may enable recycling of light reflected from the reflective polarizer 110.

In some embodiments, the display system 100 may possess optical sensing capabilities for providing secure access to the user 102 by imaging biometrics (e.g., a fingerprint) of the user 102.

As shown in FIG. 1, the second light source 146 is configured to emit light 10 in the second wavelength range R2 toward the top surface 162 of the display system 100. In some embodiments, the second light source 146 may be provided at a suitable position, such that the light 10 or a portion of the light 10 may be projected onto a predetermined fingerprint sensing area 172 at desired angles. The top surface 162 includes the predetermined fingerprint sensing area 172 for being touched by the user 102 through a finger 174 (partly shown). Further, the second light source 146 may therefore emit the light 10 that passes through the display panel 160 to reach the predetermined fingerprint sensing area 172. In some embodiments, the second light source 146 may be positioned under the display adjacent to the optical sensor 170, such that the light 10 from the second light source 146 may travel through the display system 100 and illuminate the predetermined fingerprint sensing area 172.

The light 10 from the second light source 146 interacts with the finger 174 placed in the predetermined fingerprint sensing area 172 on the top surface 162 to generate scattered or reflected light 22 from the finger 174. The light 22 may be a portion of the light 10 that is reflected from the finger 174 placed on the fingerprint sensing area 172.

The display system 100 further includes at least one optical sensor 170 disposed adjacent to the reflector 142 and opposite to the lightguide 140, such that the at least one optical sensor 170 receives at least a portion of the light 22 transmitted through the reflector 142. In some embodiments, the optical sensor 170 may include a photodiode array. In some embodiments, the photodiode array may be a complementary metal-oxide-semiconductor (CMOS) sensor, a charge coupled device (CCD) sensor array or an Organic Photodiode (OPD) or any suitable optical sensor array that is sensitive to light. In some embodiments, the optical sensor 170 includes an IR light camera configured to capture IR light.

In some embodiments, the optical sensor 170 may receive at least a portion of the light 22 that travels through the display system 100. In some embodiments, the optical sensor 170 may be suitably positioned and aligned with respect to the lightguide 140 to receive the light 22. In some embodiments, the optical sensor 170 may be configured to receive light from multiple fingers placed on the fingerprint sensing area 172. The at least one second light source 146 may aid in detection of a fingerprint of the finger 174. In some embodiments, the light 10 from the second light source 146 may be modulated to improve the optical sensing capability.

The fingerprint may be compared against a database of registered fingerprints for identification and authentication of the user 102. Such imaging biometrics may protect information stored locally on, or accessible by, an electronic device including the display system 100. Examples of such electronic devices may include, but not limited to, mobile phones, tablet computers, wrist-worn devices, gaming devices, digital broadcast terminals, messaging devices, personal digital assistants, desktop computers, kiosks, other wearable or portable devices, and the like.

In some embodiments, the predetermined fingerprint sensing area 172 may be indicated by a graphic displayed by the display system 100. For example, the predetermined fingerprint sensing area 172 may be illuminated as a visibly identifiable area for the user 102 to place the finger 174 for fingerprint sensing. The predetermined fingerprint sensing area 172 may function like the rest of the display system 100 when not being used as the predetermined fingerprint sensing area 172. In some embodiments, the predetermined fingerprint sensing area 172 may have a predetermined shape and size. For example, the predetermined fingerprint sensing area 172 may be circular or oval in shape.

In some embodiments, a remaining portion of the display system 100 apart from the predetermined fingerprint sensing area 172 may or may not be touch-sensitive. In some embodiments, the display system 100 may include multiple fingerprint sensing areas. Furthermore, in some embodiments, the predetermined fingerprint sensing area 172 may be designed to cover the entire display panel 160 of the display system 100.

In some embodiments, the display system 100 may include a frame (not shown) disposed between the reflector 142 and the optical sensor 170. In some embodiments, the frame and the reflector 142 may be bonded together, for example, by means of an optical adhesive, epoxy, lamination, and/or any other suitable method of attachment. In some embodiments, the frame may define an opening extending through the frame and aligned with the optical sensor 170, such that the light 22 received by the optical sensor 170 passes through the opening. In some embodiments, the display system 100 may include multiple optical sensors 170 aligned with corresponding openings in the frame.

In some embodiments, the display system 100 may further include other light management layers. These layers may be used for spatial mixing or color mixing of light, light source hiding, and uniformity improvement. Layers that may be used for these purposes include, but are not limited to, diffusing films, diffusing plates, partially reflective layers, color-mixing lightguides or films, and non-Gaussian diffusers (diffusing systems in which a peak brightness ray of diffused light propagates in a direction that is not parallel to a direction of the peak brightness ray of input light).

In some embodiments, the layers may include one or more color filter layers, polarizer layers, micro-structured layers, etc., or combinations thereof. In some embodiments, the display system 100 may further include a cover lens (not shown) disposed on the display panel 160. The cover lens may provide protection to the various layers within the display system 100. The cover lens may be substantially transparent and may be composed of glass, plastic, or a composite thereof, or any other suitable material (e.g., crystallized aluminum oxide).

Figure 2:
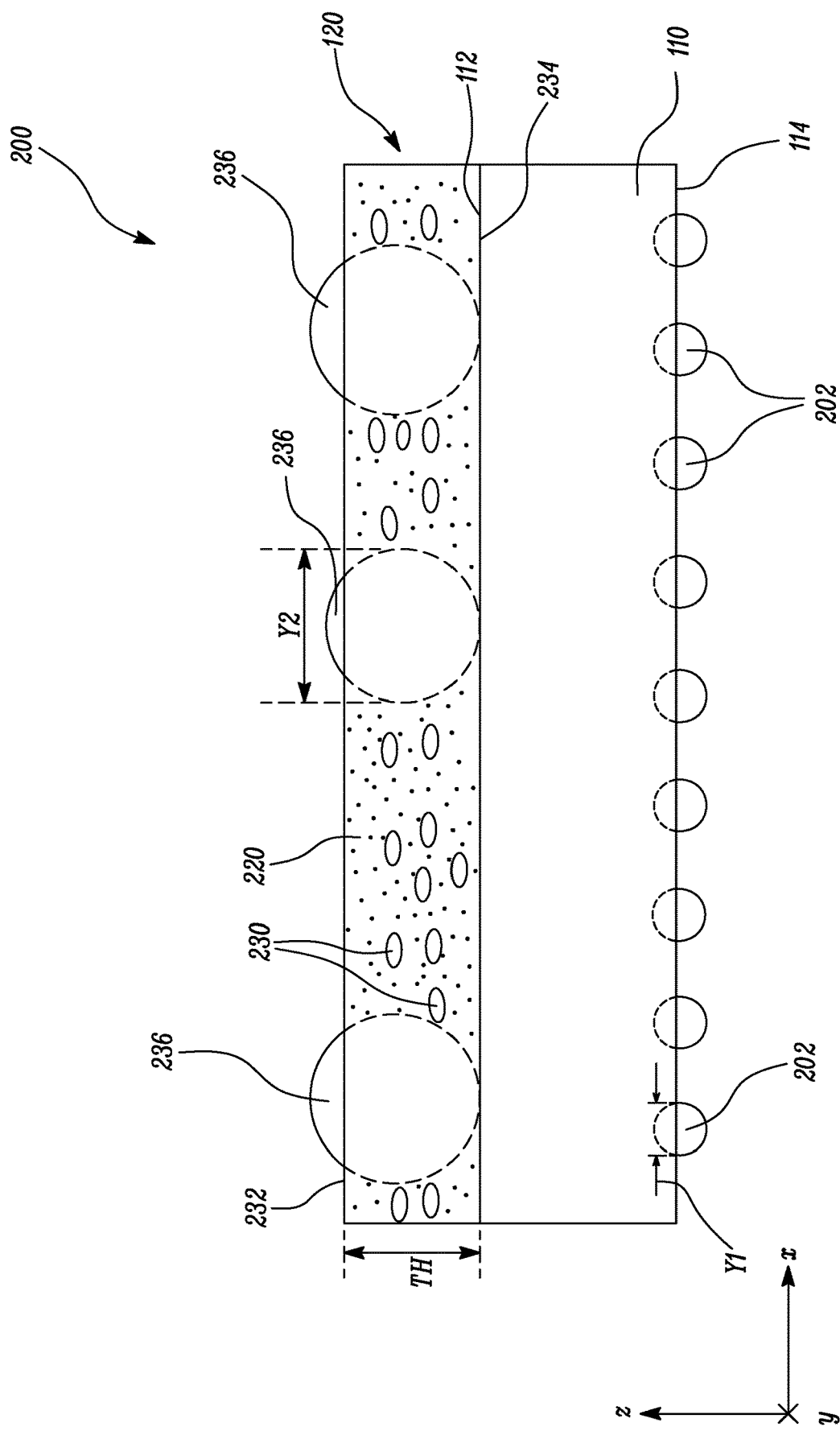
FIG. 2 illustrates a schematic sectional view of an optical construction, according to an embodiment of the present disclosure.

FIG. 2 illustrates a schematic sectional view of the optical construction 200. The optical construction 200 includes the reflective polarizer 110 including the first major surface 112 and the second major surface 114 opposite to the first major surface 112. The first major surface 112 is adjacent to the optical film 120, while the second major surface 114 is adjacent to the optical diffuser 130 (shown in FIG. 1). In some embodiments, the reflective polarizer 110 may be a collimating multilayer optical film (CMOF). The reflective polarizer 110 may substantially transmit light of a specific polarization while substantially reflecting light having other polarizations. The reflective polarizer 110 may also collimate light. In some embodiments, reflected light from the reflective polarizer 110 may be recycled by the reflector 142 (shown in FIG. 1).

The reflective polarizer 110 further includes a plurality of beads 202 protruding at least partially from the second major surface 114. For example, the second major surface 114 of the reflective polarizer 110 may be coated with low friction coatings including the beads 202 to provide good slip properties. In some embodiments, the beads 202 have an average longest dimension Y1 of between about 2 microns and about 10 microns. In some embodiments, the average longest dimension Y1 is between about 5 microns and about 10 microns. In some embodiments, the average longest dimension Y1 is less than about 15 microns, less than about 20 microns, less than about 25 microns or less than about 30 microns. In some embodiments, each bead 202 includes acrylic or polystyrene. In some embodiments, the beads 202 may be 5 microns diameter acyclic beads (available as MX500 from Soken Engineering and Chemicals Co. Ltd., Japan). The beads 202 may provide an anti-wet-out functionality that may be needed against the optical diffuser 130.

In the illustrated embodiment of FIG. 2, the beads 202 have a substantially spherical shape. However, the beads 202 may have any shape as per desired application attributes, for example, a substantially elliptical shape, a substantially oval shape, a substantially conical shape, a substantially pyramidal shape, a substantially cuboidal shape, a substantially polyhedral shape, and so forth. In some embodiments, the beads 202 may be distributed substantially uniformly on the second major surface 114 of the reflective polarizer 110. In some other embodiments, the beads 202 may be distributed randomly on the second major surface 114 of the reflective polarizer 110.

The optical construction 200 further includes the optical film 120 disposed on the first major surface 112 of the reflective polarizer 110. Specifically, the reflective polarizer 110 is coated with a layer of the optical film 120. The optical film 120 includes a first major surface 232 and a second major surface 234. The first major surface 232 is opposite to the first major surface 112 of the reflective polarizer 110. The second major surface 234 is adjacent to the first major surface 112 of the reflective polarizer 110. In the illustrated embodiment, the second major surface 234 is directly adjacent to the first major surface 112 of the reflective polarizer 110, such that at least a portion of the second major surface 234 contacts the first major surface 112. In some embodiments, each of the first and second major surfaces 232, 234 of the optical film 120 may be substantially planar. Further, each of the first and second major surfaces 232, 234 may be disposed in the x-y plane.

In some embodiments, the optical film 120 may have a thickness TH from about 1 micron to about 50 microns. The thickness TH is measured along the z-axis. Further, the thickness TH may correspond to an average thickness of the optical film 120 along the z-axis. In some other embodiments, the thickness TH is from about 5 microns to about 30 microns. In some other embodiments, the optical film 120 may have a thickness less than about 55 microns, less than about 60 microns, less than about 65 microns, or less than about 70 microns.

The optical film 120 further includes a matrix 220 and a plurality of first particles 230 dispersed in the matrix 220. Each of the matrix 220 and the plurality of first particles 230 includes a silicone polyoxamide and an acrylate polymer. In other words, both the matrix 220 and each first particle 230 includes the silicone polyoxamide and the acrylate polymer. The optical film 120 disposed on the reflective polarizer 110 and including the first particles 230 may alter a path of visible light traveling through the optical film 120.

The first particles 230 in the matrix 220 may be formed as a result of phase separation of silicone polyoxamide polymer from a solution of silicone polyoxamide and acrylate during solvent evaporation. In some embodiments, the first particles 230 include more silicon than the matrix 220. In some embodiments, the first particles 230 may include more silicon than the matrix 220 by at least 10% by atomic ratio. In some other embodiments, the first particles 230 may include more silicon than the matrix 220 by at least 20%, at least 30%, at least 40%, at least 50%, at least 60%, at least 70%, or at least 80% by atomic ratio. In some embodiments, the matrix 220 includes more carbon than the first particles 230. In some embodiments, the matrix 220 includes more carbon than the first particles 230 by at least 10% by atomic ratio. In some other embodiments, the matrix 220 includes more carbon than the first particles by at least 20%, at least 30%, at least 40%, at least 50%, at least 60%, at least 70%, or at least 80% by atomic ratio.

In some embodiments, the matrix 220 is or includes an adhesive. In some embodiments, the adhesive may facilitate bonding of the optical film 120 with the first major surface 112 of the reflective polarizer 110 (shown in FIG. 1). Further, the matrix 220 may also retain the first particles 230 in the optical film 120. In some embodiments, the adhesive includes one or more of an epoxy, a pressure sensitive adhesive, and a structural adhesive. In some embodiments, the adhesive may facilitate bonding of the optical film 120 with the absorbing polarizer 150 of the display system 100 (shown in FIG. 1).

The adhesive of the matrix 220 may include those based on general compositions of (meth)acrylates and derived adhesives. In some cases, the adhesive may further include other materials in addition to (meth)acrylates. Examples of such materials include, but are not limited to, polyvinyl ether; diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; polyvinylpyrrolidone and vinylpyrrolidone copolymers; polyesters; and mixtures or blends (continuous or discontinuous phases) of the above. The term (meth)acrylate includes acrylate and methacrylate. The (meth)acrylates may be suitable because they tend to be easy to formulate and moderate in cost, and their rheology can be tuned to meet the requirements of this disclosure. Additionally, the adhesive may include additives such as tackifiers, plasticizers, fillers, antioxidants, stabilizers, pigments, diffusing materials, curatives, fibers, filaments, and solvents. Also, the adhesive may optionally be cured by any known methods.

In some embodiments, optical properties of the optical film 120 may be modified by controlling reaction conditions, for example, by controlling one or more of a size and a density of the first particles 230. In some embodiments, the optical properties of the optical film 120 may be modified by controlling a number of film characteristics, such as the thickness TH, refractive index of constituents, spatial distribution of the plurality of first particles 230, etc. In some embodiments, the first particles 230 include less than about 30% by weight of the optical film 120. In some embodiments, the first particles 230 may include less than about 25%, less than about 20%, less than about 15%, or less than about 10% by weight of the optical film 120. In some embodiments, the first particles 230 include between about 5% to about 10% by weight of the optical film 120.

In some embodiments, the matrix 220 has a first refractive index N1 and each first particle 230 has a second refractive index N2, such that a difference between the first refractive index N1 and the second refractive index N2 is greater than about 0.05. In some embodiments, the difference between the first refractive index N1 and the second refractive index N2 is greater than about 0.06, greater than about 0.07, greater than about 0.075, or greater than about 0.08. In some embodiments, the difference between the first refractive index N1 and the second refractive index N2 is about 0.09. In some embodiments, the first refractive index N1 is about 1.49 and the second refractive index N2 is about 1.40.

The optical construction 200 further includes a plurality of second particles 236 different from the first particles 230. Specifically, the optical film 120 further includes the plurality of second particles 236 different from the first particles 230. At least some of the second particles 236 partially protrude from the at least one major surface 232 (i.e., the first major surface 232) of the optical film 120. In the illustrated embodiment of FIG. 2, at least some of the second particles 236 extend from the second major surface 234 of the optical film 120 towards the at least one major surface 232 of the optical film 120. Further, at least some of the second particles 236 at least partially protrude from the first major surface 232. In other words, at least some of the second particles 236 extend from the second major surface 234, through the thickness TH of the optical film 120, and partially protrude from the first major surface 232 of the optical film 120.

In some embodiments, the second particles 236 have a different composition than the matrix 220. In some embodiments, the second particles 236 may be mixed with the composition of the optical film 120 during preparation of the optical film 120. In some embodiments, the second particles 236 have an average longest dimension Y2 of between about 5 microns and about 50 microns. In some embodiments, the second particles 236 may have the average longest dimension of less than about 25 microns, less than about 30 microns, less than about 35 microns, less than about 40 microns, or less than about 45 microns. In the illustrated embodiment of FIG. 2, at least some of the second particles 236 may have dimensions greater than the thickness of the optical film 120, such that at least some of the second particles 236 partially protrude from the at least one major surface 232 of the optical film 120. Specifically, the average longest dimension Y2 of at least some of the second particles 236 is greater than the thickness TH of the optical film 120 (i.e., Y2>TH). In some embodiments, the second particles 236 may include 20 microns diameter acrylic beads (available as MX2000 from Soken Engineering and Chemicals Co. Ltd., Japan).

In the illustrated embodiment of FIG. 2, the second particles 236 have a substantially spherical shape. However, the second particles 236 may have any shape as per desired application attributes, for example, a substantially elliptical shape, a substantially oval shape, a substantially conical shape, a substantially pyramidal shape, a substantially cuboidal shape, a substantially polyhedral shape, and so forth. In some embodiments, the second particles 236 may be distributed substantially uniformly in the optical film 120. In some other embodiments, the second particles 236 may be distributed randomly in the optical film 120.

At least some of the second particles 236 may at least partially engage with the absorbing polarizer 150 (shown in FIG. 1), such that a gap (not shown) is formed between the optical film 120 and the absorbing polarizer 150. The inclusion of the gap between the optical film 120 and the absorbing polarizer 150 may minimize or prevent any contact between the optical film 120 and the absorbing polarizer 150. The gap may eliminate interference patterns (e.g., Newton's rings or other interference fringes) that may otherwise be formed by coherent interference of light reflected between two partially reflecting surfaces (e.g., the reflective polarizer 110 and the display panel 160) in the display system 100 of FIG. 1. The interference may appear as an optical defect in the display system 100. The second particles 236 may provide the gap between the partially reflecting surfaces, such that light reflected between these surfaces may no longer coherently interfere to cause interference patterns. The gap may therefore minimize or eliminate optical defects in the display system 100. Further, the gap may ensure accuracy of fingerprint sensing due to elimination of these optical defects.

Figure 3:
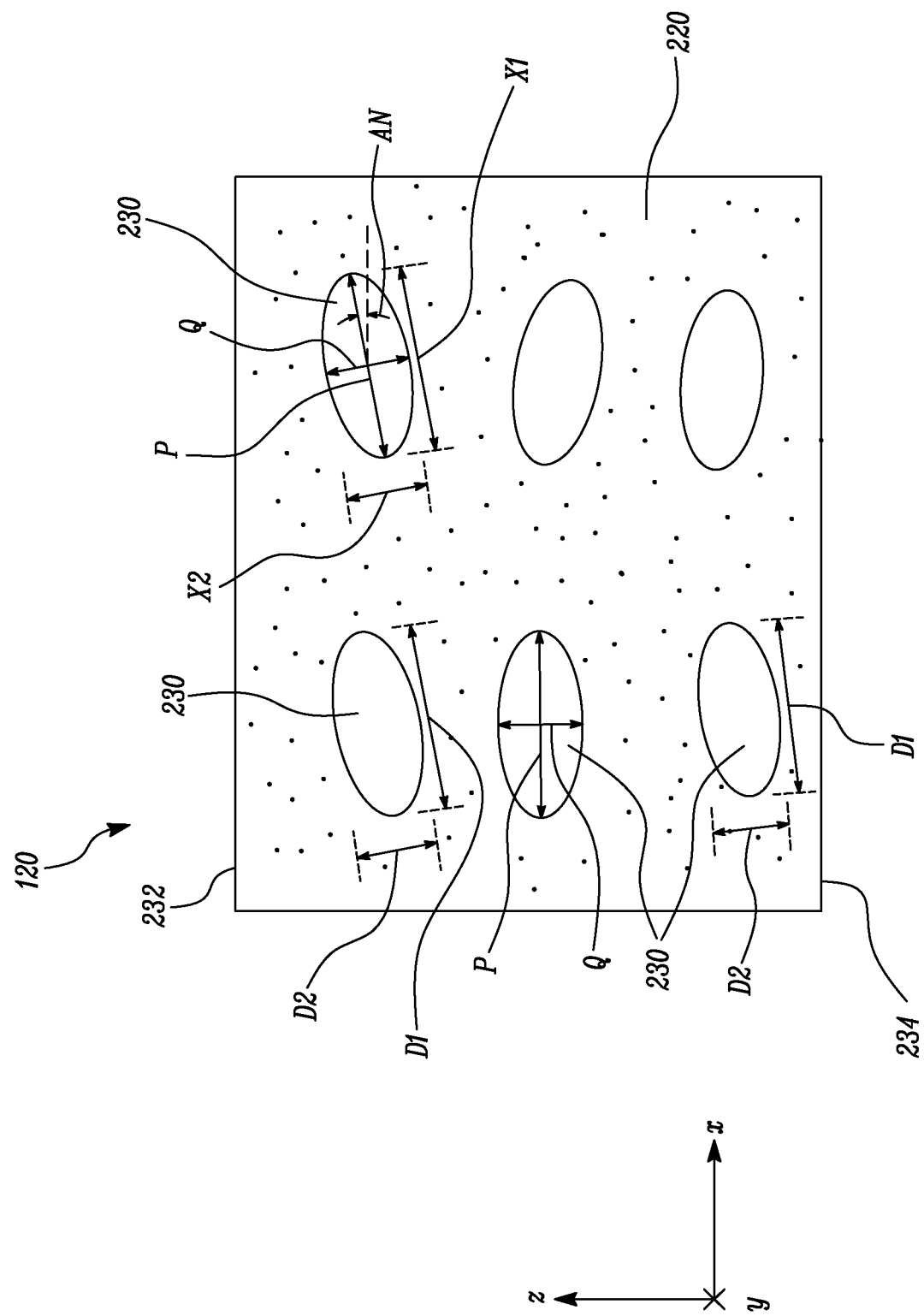
FIG. 3 illustrates a schematic sectional view of an optical film, according to an embodiment of the present disclosure.

FIG. 3 shows a detailed cross-section of the optical film 120. The cross-section of the optical film 120 in FIG. 3 is taken along the x-z plane. Referring to FIGS. 2 and 3, in the cross-section of the optical film 120, the plurality of first particles 230 have a maximum first dimension X1 along a first direction P and a maximum second dimension X2 along an orthogonal second direction Q, such that the maximum first dimension X1 is greater than the maximum second dimension X2, i.e., X1>X2. In some embodiments, the maximum first dimension X1 is greater than the maximum second dimension X2 by at least 10%. In other words, X1 is greater than X2 by at least 10%. In some embodiments, the maximum first dimension X1 is greater than the maximum second dimension X2 by at least 20%, at least 30%, at least 40%, at least 50%, at least 60%, at least 70%, or at least 80%. In some embodiments, the maximum first dimension X1 is less than about 10 microns. In some other embodiments, the maximum first dimension X1 may be less than about 8 microns, less than about 7 microns, less than about 6 microns, less than about 5 microns, less than about 4 microns, or less than about 3 microns. In some embodiments, the maximum first dimension X1 is between about 2 microns and about 5 microns.

In some embodiments, for each of at least a majority of the first particles 230, a maximum dimension D1 of the first particle 230 is along the first direction P and a maximum dimension of the first particle 230 along the orthogonal second direction Q is D2. The maximum dimension D1 is greater than the maximum dimension D2 by at least 10%. In some embodiments, the maximum dimension D1 is greater than the maximum dimension D2 by at least 20%, at least 30%, at least 40%, at least 50%, at least 60%, at least 70%, or at least 80%.

In the illustrated embodiment of FIG. 3, each first particle 230 may have a substantially oval cross-sectional shape. However, it should be understood each first particle 230 may have any cross-sectional shape (e.g., polygonal, elliptical, etc.) and size based on desired application attributes. In some embodiments, each first particle 230 may have a regular shape or an irregular shape (e.g., elongated in some directions). Each first particle 230 may have any shape which is elongated in the first direction P as compared to the orthogonal second direction Q (i.e., X1>X2).

In some embodiments, the first directions P of the first particles 230 are within about 10 degrees of each other. In some embodiments, the first directions P of the first particles 230 make oblique angles AN with the at least one major surface 232 (i.e., the first major surface 232) of the optical film 120 of less than about 20 degrees. In some embodiments, the first directions P of the first particles 230 make oblique angles AN with the at least one major surface 232 of the optical film 120 of less than about 15 degrees, less than about 10 degrees, or less than 5 degrees. In some embodiments, the first particles 230 may substantially align with an inclination of a major surface on which the optical film 120 is provided or coated. This property of the first particles 230 may be used to control the optical properties of the optical film 120.

In some embodiments, the at least one major surface 232 is substantially planar and is located in the x-y plane. The first directions P of at least some of the first particles 230 may therefore make the oblique angle AN relative to the x-y plane. In some embodiments, the first directions P of at least one first particle 230 may be substantially parallel to the x-y plane, i.e., the oblique angle AN is substantially zero. As such, the first directions P may vary across the first particles 230. However, the maximum variation in the first directions P may be generally within a maximum value due to a tendency of the first particles 230 to substantially align with the at least one major surface 232 of the optical film 120. Consequently, the oblique angles AN may be below a maximum value.

In the illustrated embodiment of FIG. 3, the cross-section is taken along the x-z plane. The first particles 230 may have a similar shape and dimensions in a cross-section taken along the y-z plane. Specifically, in the cross-section of the optical film 120 taken along the y-z plane, each first particle 230 may have the maximum first dimension X1 along the first direction P and the maximum second dimension X2 along the orthogonal second direction Q. In some cases, each first particle 230 may have substantially similar shape and dimensions along the x-axis and the y-axis. In some cases, in a cross-section of the optical film 120 taken in the x-y plane, each first particle 230 may have a substantially circular shape.

Further, at least a subset of the first particles 230 may have different shape, dimensions, and composition from each other. In some embodiments, the shape and size of the first particles 230 may be chosen such that only certain wavelengths of light are scattered (i.e., diffused), while other wavelengths are substantially allowed to pass through the optical film 120 without scattering. In other words, light in certain wavelengths may undergo diffused transmission (i.e., an angular distribution of a transmitted light is substantially different from that of an incident light) through the optical film 120, while light in other wavelengths may undergo specular transmission (i.e., an angular distribution of a transmitted light is substantially the same as that of an incident light) through the optical film 120.

In some embodiments, a scattering ratio of the optical film 120 at one wavelength of light may be significantly different from a scattering ratio at a different wavelength of light. In some embodiments, a scattering ratio of the optical film 120 for an incident light in the first wavelength range R1 (e.g., visible wavelength range) may be significantly greater than a scattering ratio of the optical film 120 for an incident light in the second wavelength range R2 (i.e., IR wavelength range).

Figure 4:
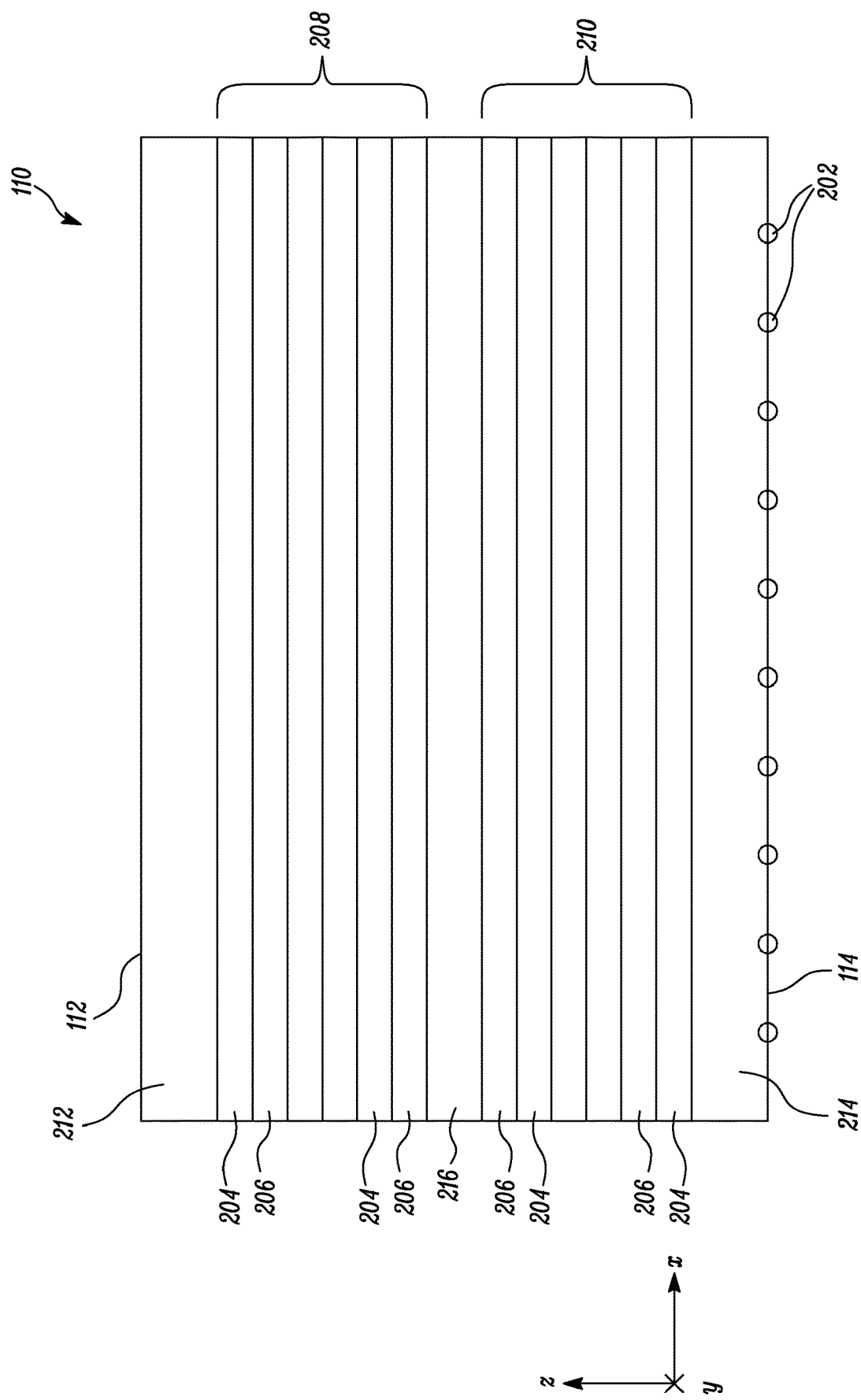
FIG. 4 illustrates a detailed schematic view of a reflective polarizer, according to an embodiment of the present disclosure.

FIG. 4 illustrates a schematic view of the reflective polarizer 110. In some embodiments, the reflective polarizer 110 may allow light of a specific polarization to pass through while reflecting light of other polarizations. In the illustrated embodiment, the reflective polarizer 110 is configured as a CMOF. The reflective polarizer 110 includes the first major surface 112 and the second major surface 114 opposite the first major surface 112.

The reflective polarizer 110 includes a plurality of alternating first and second polymeric layers 204, 206. In some embodiments, the first polymeric layer 204 includes a material with a high refractive index and the second polymeric layer 206 includes a material with a low refractive index. In some embodiments, at least one of the first polymeric layer 204 and the second polymeric layer 206 includes a birefringent material. The refractive indices of the first and second polymeric layers 204, 206 may be matched for light polarized in one polarization state and unmatched for light in an orthogonal polarization state. In such cases, an incident light in the matched polarization state is substantially transmitted through the reflective polarizer 110 and an incident light in the unmatched polarization state is substantially reflected by the reflective polarizer 110. In some embodiments, the material of each first polymeric layer 204 is a birefringent polyester polyethylene naphthalate (PEN). In some embodiments, the material of each second polymeric layer 206 is an amorphous polyester.

The first and second polymeric layers 204, 206 may be provided with specific layer profiles. In some embodiments, a number of the first polymeric layer 204 may be between 50 and 1000. Similarly, a number of the second polymeric layer 206 may be between 50 and 1000. In some embodiments, the number of first and second polymeric layers 204, 206 may be greater than about 200, greater than about 400, greater than about 500, greater than about 750, greater than about 900, or greater than about 1000. Further, in some examples, an average thickness of each of the first and second polymeric layers 204, 206 may be less than about 500 nm, less than about 300 nm, less than about 250 nm, less than about 100 nm, or less than about 50 nm.

The plurality of alternating first and second polymeric layers 204, 206 include a first packet 208 of the first and second polymeric layers 204, 206 and a second packet 210 of the first and second polymeric layers 204, 206. In some embodiments, the reflective polarizer 110 further includes at least one intermediate layer 216 disposed between the first packet 208 and the second packet 210. In some embodiments, an average thickness of the at least one intermediate layer 216 may be at least about 200 nm, at least about 300 nm, at least about 400 nm, at least about 500 nm, or at least about 600 nm. In some embodiments, the intermediate layer 216 includes a material with a low refractive index. In some embodiments, the reflective polarizer 110 may include multiple packets of alternating first and second polymeric layers 204, 206 separated by intermediate layers, such as the intermediate layer 216.

In some embodiments, the reflective polarizer 110 further includes at least one first skin layer 212 defining the first major surface 112 and at least one second skin layer 214 defining the second major surface 114, such that the plurality of alternating first and second polymeric layers 204, 206 are disposed between the at least one first skin layer 212 and the at least one second skin layer 214. In some embodiments, the optical film 120 (shown in FIG. 2) is disposed adjacent to the at least one first skin layer 212 and the optical diffuser 130 (shown in FIG. 1) is disposed adjacent the at least one second skin layer 214. The first and second skin layers 212, 214 may protect the first and second packets 208, 210, and may also provide mechanical stability to the reflective polarizer 110. In some cases, the first and second skin layers 212, 214 may act as protective boundary layers. In some embodiments, an average thickness of each of the first and second skin layers 212, 214 may be at least about 200 nm, at least about 300 nm, at least about 400 nm, at least about 500 nm, or at least about 600 nm.

In some embodiments, the first and second skin layers 212, 214, the first and second packets 208, 210, and the intermediate layer 216 have high infrared clarity, i.e., the first and second skin layers 212, 214, the first and second packets 208, 210, and the intermediate layer 216 substantially transmit light in the second wavelength range R2.

The reflective polarizer 110 further includes the beads 202 protruding at least partially from the second major surface 114. In the illustrated embodiment of FIG. 4, the beads 202 protrude at least partially from the skin layer 214.

Figure 5B:
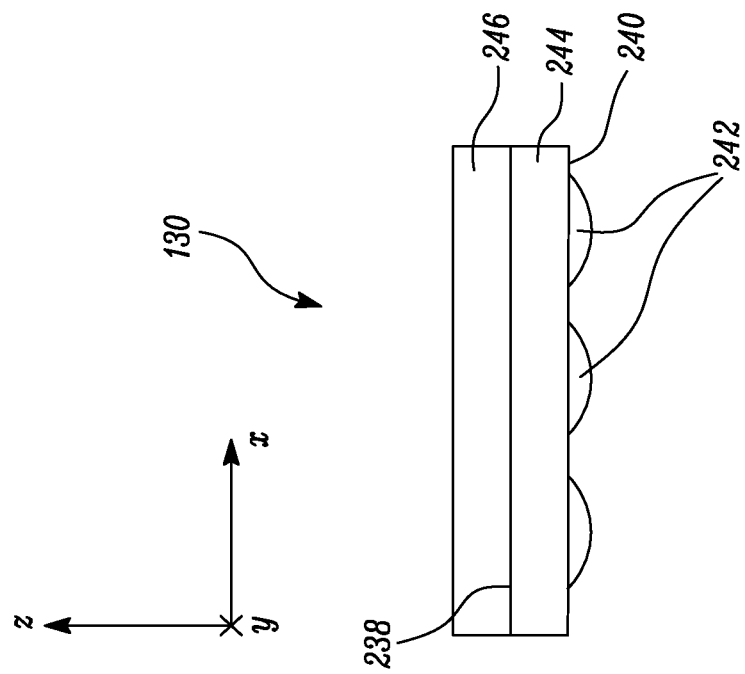
FIGS. 5A and 5B illustrate schematic bottom and sectional views, respectively, of an optical diffuser, according to an embodiment of the present disclosure.
Figure 5A:
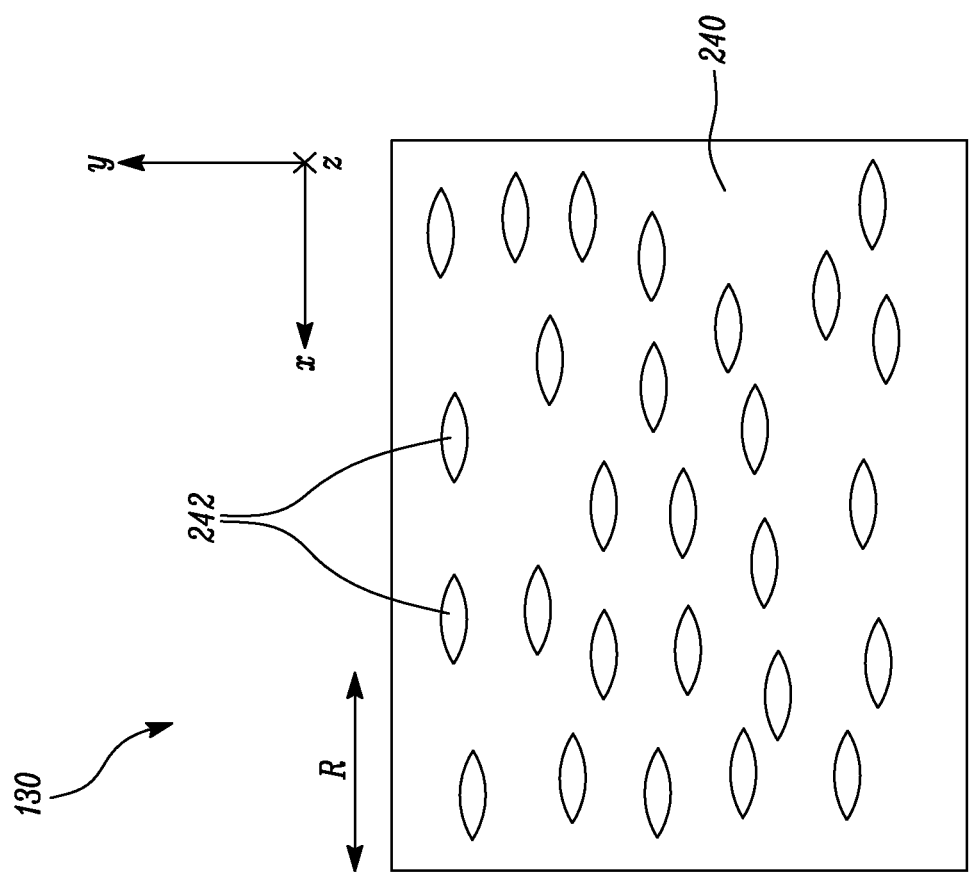

FIGS. 5A and 5B show different views of the optical diffuser 130. FIG. 5A shows a bottom view of a second major surface 240 of the optical diffuser 130. FIG. 5B shows a cross-section of the optical diffuser 130 in the x-z plane. The second major surface 240 of the optical diffuser 130 is substantially disposed in the x-y plane. The optical diffuser 130 includes microstructures that may influence the optical properties of the optical diffuser 130.

Referring to FIGS. 5A and 5B, the optical diffuser 130 includes a substrate 244 having a first major surface 238 and the second major surface 240. A diffusive optical film 246 is disposed on the first major surface 238 of the optical diffuser 130. Specifically, the first major surface 238 is coated with a layer of the diffusive optical film 246. In some embodiments, the diffusive optical film 246 may be similar to the optical film 110 (shown in FIGS. 1-3). However, in other embodiments, the diffusive optical film 246 may be any other type of diffusive film that substantially transmits light in the second wavelength range R2. The substrate 244 may include or be made of glass and/or polymers, such as polyethylene terephthalate (PET), polycarbonates, acrylics, polymethylmethacrylate (PMMA), polyvinyl chloride (PVC), polyvinyl alcohol (PVA), polyolefin, polyethylene, polyethylene naphthalate, cellulose acetate, polystyrene, and polyimide, etc. The substrate 244 may be rigid or flexible.

The diffusive optical film 246 may alter a path of visible light traveling through the optical diffuser 130. In some embodiments, the optical diffuser 130 is configured to scatter an incident light for each wavelength in the first wavelength range R1 and configured to transmit at least about 60% of the incident light for each wavelength in the second wavelength range R2. Specifically, the diffusive optical film 246 may scatter only certain wavelengths of light (i.e., wavelengths of light in the first wavelength range R1), while other wavelengths (i.e., wavelengths of light in the second wavelength range R2) are substantially allowed to pass through the optical diffuser 130 without scattering. In other words, light in certain wavelengths may undergo diffused transmission through the optical diffuser 130, while light in other wavelengths may undergo specular transmission through the optical diffuser 130. In some embodiments, a scattering ratio of the optical diffuser 130 for an incident light in the first wavelength range R1 (e.g., visible wavelength range) may be significantly greater than a scattering ratio of the optical diffuser 130 for an incident light in the second wavelength range R2 (i.e., IR wavelength range). In some embodiments, the optical diffuser 130 including the diffusive optical film 246 has an optical haze from about 60% to about 100% for incident light in the first wavelength range R1.

The optical diffuser 130 includes a plurality of spaced apart elongated structures 242 on the at least one major surface thereof. Specifically, the plurality of spaced apart elongated structures 242 are disposed on the second major surface 240 of the optical diffuser 130. The elongated structures 242 are elongated along a same first direction R. The same first direction R may be substantially along the x-axis. The elongated structures 242 may be inverted canoe-shaped microstructures. Further, the elongated structures 242 are arranged substantially randomly across the second major surface 240. The elongated structures 242 at least partially protrude from the second major surface 240 of the optical diffuser 130. The elongated structures 242 may act as anti-wetout structures to minimize or eliminate wetout between the optical diffuser 130 and the lightguide 140 (shown in FIG. 1). In some embodiments, the second major surface 240 may correspond to a surface opposite to the emission surface 132 (shown in FIG. 1) of the optical diffuser 130.

The optical properties of various components of the display system 100 (shown in FIG. 1) will be discussed hereinafter in greater detail.

Figure 6:
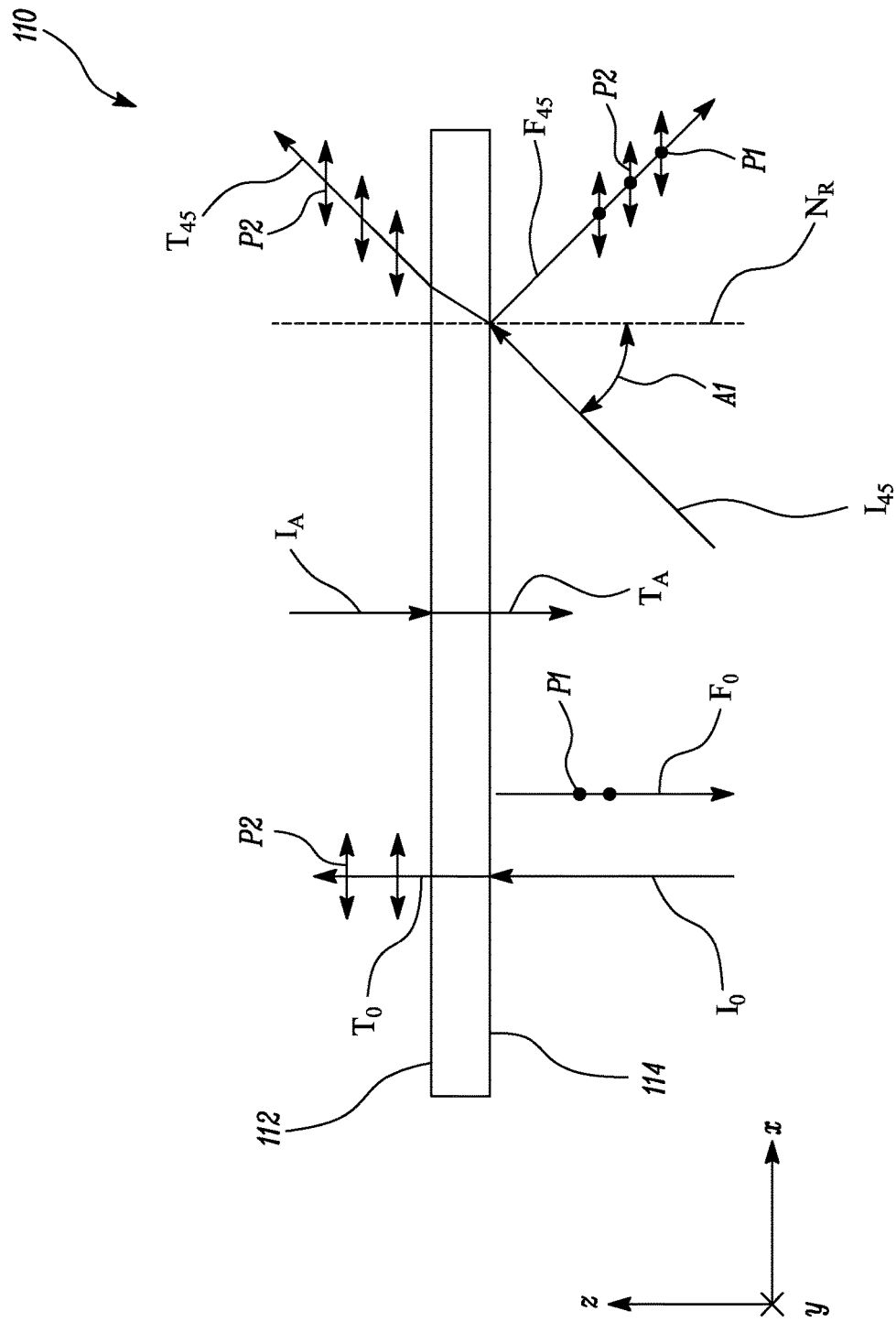
FIG. 6 illustrates a schematic view of the reflective polarizer, according to an embodiment of the present disclosure.

FIG. 6 illustrates a schematic view of the reflective polarizer 110. In some embodiments, the reflective polarizer 110 may function as a light collimating layer. For example, the reflective polarizer 110 may redirect at least a portion of light incident at various angles on the second major surface 114, such that light exiting from the first major surface 112 of the reflective polarizer 110 is substantially perpendicular to the first major surface 112 of the reflective polarizer 110.

As shown in FIG. 6, light is incident on the reflective polarizer 110 at two separate incidence angles, 0 degree (i.e., substantially normal to the second major surface 114) and 45 degrees (i.e., 45 degrees relative to a normal NR to the second major surface 114). However, light may enter the reflective polarizer 110 at various other angles, but these two angles are shown for the purpose of illustration. Further, light incident on the second major surface 114 of the reflective polarizer 110 may be unpolarized (i.e., light having multiple polarization states). However, in some other cases, light incident on the second major surface 114 may be at least partially polarized light. For the purpose of discussion, light incident on the second major surface 114 may be treated as light having an unknown or arbitrary polarization state or distribution of polarization states.

Light with an incident angle of 0 degree (i.e., substantially normally incident light) is shown as incident light $I_0$. Light with an incident angle of 45 degrees is shown as incident light $I_{45}$. The incident light $I_0$ may also be interchangeably referred to as the substantially normally incident light $I_0$. The incident light $I_{45}$ may also be interchangeably referred to as the obliquely incident light $I_{45}$. The incident lights $I_0$ and $I_{45}$ represent light in the first wavelength range R1 (i.e., visible wavelength range). Specifically, the incident lights $I_0$ and $I_{45}$ may originate from the at least one first light source 144 (shown in FIG. 1) and may therefore lie in the first wavelength range R1. Further, an incident light $I_A$ is incident on the first major surface 112 of the reflective polarizer 110. The incident light $I_A$ is in the second wavelength range R2 (i.e., IR wavelength range). In some embodiments, the incident light $I_A$ may be reflected from the finger 174 (shown in FIG. 1) placed in the predetermined fingerprint sensing area 172 (shown in FIG. 1).

Though the incident light $I_A$ is shown as substantially normally incident light, the incident light $I_A$ may be incident at any oblique angle relative to the normal NR. For example, light in the second wavelength range R2 may be incident on the first major surface 112 at an oblique angle of at least about 30 degrees, at least about 45 degrees, or at least about 60 degrees relative to the normal NR. Further, light in the second wavelength range R2 may also be incident on the second major surface 114. In such cases, light in the second wavelength range R2 may originate from the at least one second light source 146 (shown in FIG. 1). Similarly, light in the first wavelength range R1 may be incident on the second major surface 114 at an oblique angle of at least about 30 degrees, at least about 45 degrees, or at least about 60 degrees relative to the normal NR. Further, light in the first wavelength range R1 may also be incident on the first major surface 112. As discussed before, the incident lights $I_0$, $I_{45}$, $I_A$ may have an unknown or arbitrary polarization state or distribution of polarization states. In some embodiments, for a given light, optical properties of the reflective polarizer 110 may remain same irrespective of the light being incident on the first major surface 112 or the second major surface 114.

For the first wavelength range R1, the reflective polarizer 110 is configured to reflect a portion of light and transmit a portion of light received from the optical diffuser 130 (shown in FIG. 1). Some portion of the incident light $I_0$ and incident light $I_{45}$ is reflected by the reflective polarizer 110 as reflected light $F_0$ and reflected light $F_{45}$, respectively. Further, some portions of the incident lights $I_0$, $I_{45}$ pass through the reflective polarizer 110 as transmitted lights $T_0$, $T_{45}$, respectively. In other words, light exiting the reflective polarizer 110 is shown as the transmitted light $T_0$, i.e., light exiting the reflective polarizer 110 corresponding to the substantially normally incident light $I_0$. Similarly, light exiting the reflective polarizer 110 is shown as the transmitted light $T_{45}$, i.e., light exiting the reflective polarizer 110 corresponding to the obliquely incident light $I_{45}$. Light reflected by the reflective polarizer 110 is shown as the reflected lights $F_0$ and $F_{45}$. The reflected light $F_0$ may be reflected from a point of incidence of the incident light $I_0$. The reflected light $F_0$ is shown displaced from the original position for the purpose of clarity. Some light may exit the reflective polarizer 110 at any number of exit angles, but the transmitted light $T_0$ is only shown for exemplary purposes.

For the substantially normally incident light $I_0$ and for at least a first wavelength W1 in the first wavelength range R1 from about 400 nm to about 700 nm, the reflective polarizer 110 reflects at least about 60% of the normally incident light $I_0$ for a first polarization state P1 and transmits at least about 40% of the normally incident light $I_0$ for an orthogonal second polarization state P2. In some other embodiments, for the substantially normally incident light $I_0$ and for at least the first wavelength W1 in the first wavelength range R1 from about 400 nm to about 700 nm, the reflective polarizer 110 reflects at least about 70%, at least about 80%, at least about 90%, at least about 95%, or at least about 98% of the normally incident light $I_0$ for the first polarization state P1. In some other embodiments, for the substantially normally incident light $I_0$ and for at least the first wavelength W1 in the first wavelength range R1 from about 400 nm to about 700 nm, the reflective polarizer 110 transmits at least about 45%, at least about 55%, at least about 60%, at least about 70%, at least about 80%, at least about 90%, or at least about 95% of the normally incident light $I_0$ for the second polarization state P2. In some embodiments, the transmitted light $T_0$ may include light substantially in the second polarization state P2. In some embodiments, the reflected light $F_0$ may include light substantially in the first polarization state P1. The reflected light $F_0$ may be recycled.

In some embodiments, for the substantially normally incident light $I_0$ and for the first wavelength range R1 from about 400 nm to about 700 nm, the reflective polarizer 110 has an average optical reflectance $R_{avg}$ of at least about 60% for the first polarization state P1 and an average optical transmittance $T_{avg}$ of at least about 40% for the orthogonal second polarization state P2. In some other embodiments, for the substantially normally incident light $I_0$ and for the first wavelength range R1 from about 400 nm to about 700 nm, the reflective polarizer 110 has the average optical reflectance $R_{avg}$ of at least about 70%, at least about 80%, at least about 90%, at least about 95%, or at least about 98% for the first polarization state P1. In some other embodiments, for the substantially normally incident light $I_0$ and for the first wavelength range R1 from about 400 nm to about 700 nm, the reflective polarizer 110 has the average optical transmittance $T_{avg}$ at least about 60%, at least about 70%, at least about 80%, at least about 90%, or at least about 95% for the second polarization state P2.

The first and second polarization states P1, P2 may be mutually orthogonal linearly polarized states. The first polarization state P1 refers to a polarization state orthogonal to a pass axis of the reflective polarizer 110. In other words, light polarized orthogonal to the pass axis of the reflective polarizer 110 is substantially reflected. In the illustrated embodiment of FIG. 6, the first polarization state P1 is shown substantially parallel to the y-axis. The second polarization state P2 refers to a polarization state parallel to the pass axis of the reflective polarizer 110. In other words, light polarized along the pass axis of the reflective polarizer 110 is substantially transmitted. In the illustrated embodiment of FIG. 6, the second polarization state P2 is shown substantially parallel to the x-axis. Therefore, the pass axis of the reflective polarizer 110 is substantially parallel to the x-axis, while the block axis is substantially parallel to the y-axis.

In some embodiments, the first polarization state P1 may correspond to s-polarized light and the second polarization state P2 may correspond to p-polarized light. In some other embodiments, the first polarization state P1 may correspond to p-polarization state and the second polarization state P2 may correspond to s-polarization state.

In some embodiments, for the obliquely incident light $I_{45}$ having an incident angle A1 of at least about 45 degrees and for at least the first wavelength W1, the reflective polarizer 110 reflects at least about 60% of the obliquely incident light incident light $I_{45}$ for each of the first polarization state P1 and the second polarization state P2. In some embodiments, the reflected light $F_{45}$ includes both the first and second polarization states P1, P2. In some embodiments, for the obliquely incident light $I_{45}$ having the incident angle A1 of at least about 45 degrees and for the first wavelength range R1, the reflective polarizer 110 has an average optical reflectance $R1_{avg}$ of at least about 60% for each of the first polarization state P1 and the second polarization state P2. In some embodiments, the incident angle A1 may be at least about 60 degrees. In some embodiments, the transmitted light $T_{45}$ may include light mostly in the second polarization state P2.

Since the reflective polarizer 110 also acts a collimating film, the reflective polarizer 110 substantially blocks obliquely incident light (e.g., the incident light $I_{45}$) irrespective of a polarization state. In other words, the reflective polarizer 110 substantially reflects obliquely incident light for each of the first and second polarization states P1, P2. The reflected light may be recycled. An amount of transmitted light in case of obliquely incident light may be significantly less as compared to an amount of transmitted light (e.g., the transmitted light $T_0$) in case of normally incident light (e.g., $I_0$). Therefore, the reflective polarizer 110 may increase the amount of the transmitted light $T_0$ and decrease the amount of obliquely transmitted light.

In some other embodiments, for the obliquely incident light $I_{45}$ having the incident angle A1 of at least about 45 degrees and for at least the first wavelength W1, the reflective polarizer 110 reflects at least about 70%, at least about 80%, at least about 90%, at least about 95%, or at least about 98% of the obliquely incident light incident light $I_{45}$ for each of the first polarization state P1 and the second polarization state P2. In some other embodiments, for the obliquely incident light $I_{45}$ having the incident angle A1 of at least about 45 degrees and for the first wavelength range R1, the reflective polarizer 110 has the average optical reflectance $R1_{avg}$ of at least about 70%%, at least about 80%, at least about 90%, at least about 95%, or at least about 98% for each of the first polarization state P1 and the second polarization state P2.

Referring now to FIGS. 1 and 6, as light in the first wavelength range R1 enters the reflective polarizer 110 from the optical diffuser 130, light in the first polarization state P1 may be substantially reflected back to the optical diffuser 130, and light in the second polarization state P2 may be substantially transmitted through the reflective polarizer 110. At least a portion of light transmitted through the reflective polarizer 110 (e.g., the transmitted light $T_0$) may then reach the display panel 160, which may selectively transmit or block light to create images, graphics, or text on the display panel 160.

In some embodiments, one or more absorbing polarizers (e.g., the absorbing polarizer 150) may be disposed between the reflective polarizer 110 and the display panel 160. In some embodiments, the absorbing polarizer 150 may be laminated to the optical construction 200. The absorbing polarizer 150 may substantially absorb light of the different polarization state, such as the first polarization state P1, that may have leaked through the reflective polarizer 110. The absorbing polarizer 150 may increase a contrast of the display system 100. In some embodiments, an additional reflective polarizer (not shown) may be disposed between the absorbing polarizer 150 and the optical construction 200. In some cases, the additional reflective polarizer may be laminated to the optical construction 200. The additional reflective polarizer may increase a brightness of the display system 100 by recycling the polarization (e.g., the first polarization state P1) that is not yet parallel to a pass axis (i.e., x-axis) of the absorbing polarizer. The additional reflective polarizer may recycle the other polarizations such that photons are not lost and otherwise absorbed by the absorbing polarizer 150.

In some embodiments, each of the reflective polarizer 110, the absorbing polarizer 150, the lightguide 140, and the reflector 142 may substantially allow transmission of light in the second wavelength range R2 (i.e., IR light). In some embodiments, for at least the second wavelength W2 in the second wavelength range R2 from about 800 nm to about 1500 nm, the reflective polarizer 110 transmits at least about 60% of the incident light $I_A$ for each of the first polarization state P1 and the second polarization state P2. In some other embodiments, for at least the second wavelength W2 in the second wavelength range R2 from about 800 nm to about 1500 nm, the reflective polarizer 110 transmits at least about 70%, at least about 80%, at least about 90%, at least about 95%, or at least about 98% of the incident light $I_A$ for each of the first polarization state P1 and the second polarization state P2.

The reflective polarizer 110 may be substantially transparent to the incident light $I_A$ in the second wavelength range R2. Therefore, the reflective polarizer 110 may substantially transmit the incident light $I_A$ as a transmitted light $T_A$ irrespective of a polarization state of the incident light $I_A$. Further, the incident light $I_A$ may undergo substantially specular transmission through the reflective polarizer 110. Similarly, light incident on the second major surface 114 of the reflective polarizer 110 and in the second wavelength range R2 may be substantially transmitted irrespective of a polarization state and an angle of incidence of the incident light. Therefore, for a given light in the second wavelength range R2, the reflective polarizer 110 may exhibit similar optical properties irrespective of the light being incident on the first major surface 112 or the second major surface 114.

Figure 7:
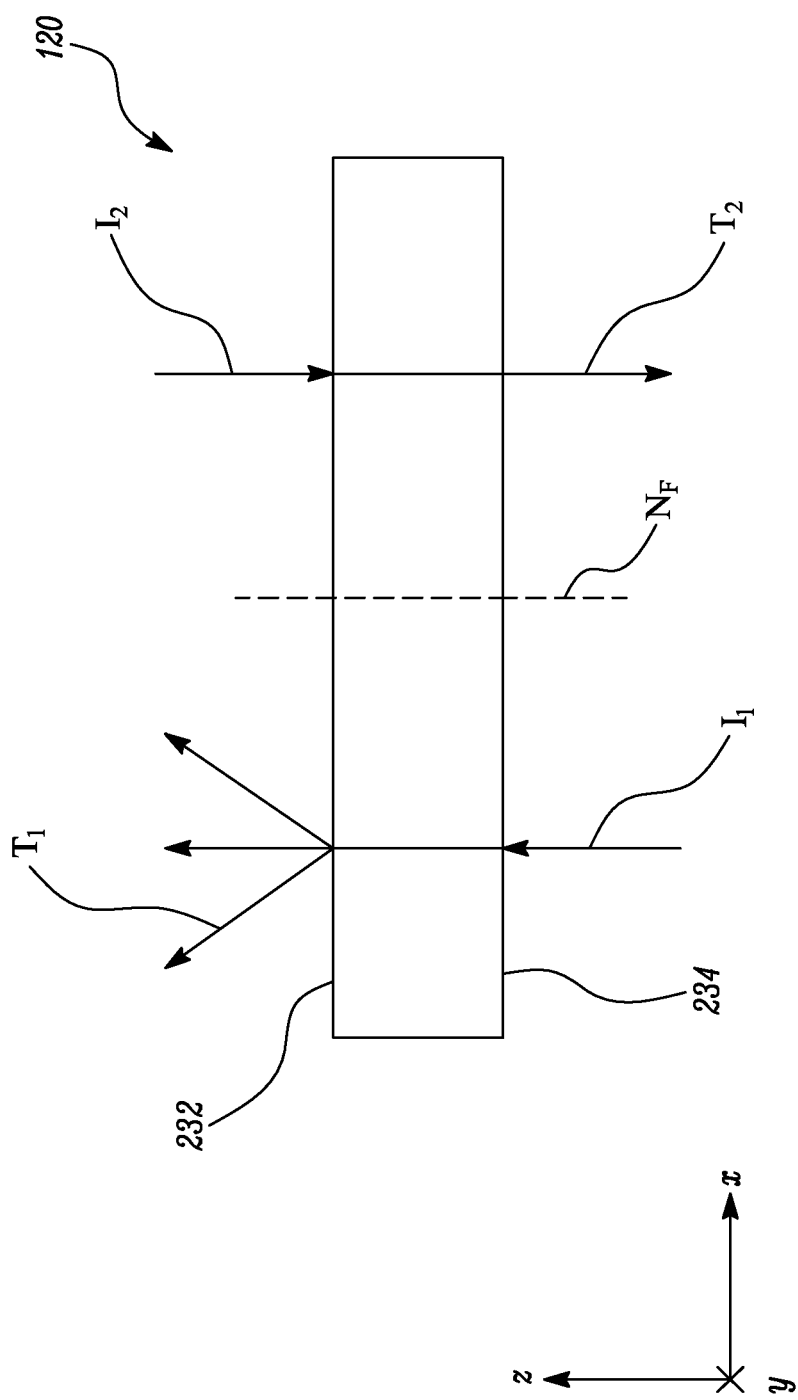
FIG. 7 illustrates a schematic view of the optical film, according to an embodiment of the present disclosure.

FIG. 7 shows a schematic view of the optical film 120. Some details of the optical film 120 including the matrix 220, the first particles 230, and the second particles 236 are not shown in FIG. 7 for the purpose of clarity. An incident light $I_1$ is incident on the second major surface 234 of the optical film 120, while an incident light $I_2$ is incident on the first major surface 232 of the optical film 120. However, the incident lights $I_1$, $I_2$ may be incident on any one of the first and second major surfaces 232, 234 of the optical film 120. Though the incident lights $I_1$, $I_2$ are illustrated as substantially normally incident lights, in some other cases, at least one of the incident lights $I_1$, $I_2$ may also be obliquely incident on the respective surfaces of the optical film 120. For example, in some cases, at least one of the incident lights $I_1$, $I_2$ may be incident at an oblique angle of at least about 30 degrees, at least about 45 degrees, or at least about 60 degrees relative to a normal $N_F$. The incident light $I_1$ may originate from the at least one first light source 144 (shown in FIG. 1) and may lie in the first wavelength range R1. The incident light $I_2$ may lie in the second wavelength range R2. In some embodiments, the incident light $I_2$ may be reflected from the finger 174 (shown in FIG. 1) placed in the predetermined fingerprint sensing area 172 (shown in FIG. 1). For the purpose of discussion, the incident lights $I_1$, $I_2$ may be treated as light having an unknown or arbitrary polarization state or distribution of polarization states. In some cases, light in the second wavelength range R2 may be incident on the second major surface 234 of the optical film 120. In such cases, light in the second wavelength range R2 may originate from the at least one second light source 146 (shown in FIG. 1).

In some embodiments, for at least the first wavelength W1 in the first wavelength range R1 from about 400 nm to about 700 nm, the optical film 120 is configured to scatter the incident light $I_1$ for each of the first and second polarization states P1, P2. In some other embodiments, for each wavelength in the first wavelength range R1 from about 400 nm to about 700 nm, the optical film 120 is configured to scatter the incident light $I_1$ for each of the first and second polarization states P1, P2.

In some embodiments, for at least the first wavelength W1 in the first wavelength range R1 from about 400 nm to 700 nm, the optical film 120 has an optical haze H and a depolarization ratio D. The depolarization ratio D of the optical film 120 may relate to a deviation of a polarization state of a transmitted light from a polarization state of an incident light. A greater value of the depolarization ratio D may indicate a greater deviation of the polarization state of the transmitted light from the polarization state of the incident light, and vice versa. The depolarization ratio D of the optical film 120 may be indicative of a percentage or a ratio of the incident light that has been transmitted with a different polarization state than that of the incident light. For measurements involving the optical construction 200 that includes the reflective polarizer 110 and the optical film 120, transmission through the reflective polarizer 110 may have to be considered to obtain the depolarization ratio D of the optical film 120. In some embodiments, each of the depolarization ratio D and the optical haze H is expressed as a percentage value.

In an example, the depolarization ratio D of the optical film 120 may be measured by mounting the optical construction 200 and the reflective polarizer 110 (without the optical film 120) between a uniform backlight source (MB-BL6x4, available from Metaphase Technologies Inc., Bristol, PA) and a Melles Griot linear polarizer mounted on a rotating stage. Luminosity of the backlight source, as viewed through the Melles Griot linear polarizer, may be measured using a spectroradiometer (PR650, available from Photoresearch Inc., Syracuse, NY) placed at 58 cm from the light source. The depolarization ratio D of the optical film 120 may be calculated as:

$$\text{Depolarization Ratio } D = \frac{L_2^{perp} - L_1^{perp}}{L_1^{par} - L_1^{perp}} \times 100\%$$

where, $L_2^{perp}$: Measured luminosity when a pass axis (i.e., x-axis) of the optical construction 200 is perpendicular to a pass axis of the linear polarizer.

$L_1^{perp}$: Measured luminosity when a pass axis (i.e., x-axis) of the reflective polarizer 110 (without the optical film 120) is perpendicular to the pass axis of the linear polarizer.

$L_1^{par}$: Measured luminosity when the pass axis of the reflective polarizer 110 (without the optical film 120) is parallel to the pass axis of the linear polarizer.

In the illustrated embodiment, the optical film 120 transmits the incident light $I_1$ as a transmitted light $T_1$. The depolarization ratio D may indicate the deviation of a polarization state of the transmitted light $T_1$ from a polarization state of the incident light $I_1$. In an example, the incident light $I_1$ may have the second polarization state P2. The depolarization ratio D may indicate a percentage or a ratio of the incident light $I_1$ that has been transmitted with the first polarization state P1.

The optical film 120 may further scatter the incident light $I_1$ as the transmitted light $T_1$. The diffusion of the incident light $I_1$ may occur at least due to the first particles 230 dispersed in the matrix 220 of the optical film 120. However, the optical film 120 scatters the incident light $I_1$ while substantially preserving the polarization state of the incident light $I_1$. In other words, the optical film 120 scatters the incident light $I_1$ in the first wavelength range R1 (i.e., visible wavelength range) with a low value of the depolarization ratio D. The optical haze H may be a measure of the scattering of the incident light $I_1$. Due to the low value of the depolarization ratio D of the optical film 120, a ratio of the depolarization ratio D to the optical haze H is also low. Further, the optical film 120 may scatter the incident light $I_1$ in the first wavelengths range R1 irrespective of a polarization state and an angle of incidence of the incident light $I_1$.

In some embodiments, the ratio of the depolarization ratio D to the optical haze H is less than about 0.1. In some embodiments, the ratio of the depolarization ratio D to the optical haze H is less than about 0.075, less than about 0.05, less than about 0.025, less than about 0.02, less than about 0.015, or less than about 0.01. In some embodiments, the ratio of the depolarization ratio D to the optical haze H is between about 0.005 and about 0.01.

In some embodiments, the optical haze H is at least about 25%, at least about 35%, at least about 45%, or at least about 65%. In some embodiments, the depolarization ratio D is less than about 5%, less than about 3%, less than about 2%, or less than about 1%.

In some embodiments, for the first wavelength range R1, the optical film 120 has an average optical haze $H_{avg}$ and an average depolarization ratio $D_{avg}$. In some embodiments, the average optical haze $H_{avg}$ is at least about 25%, at least about 35%, at least about 45%, or at least about 65%. In some embodiments, the average depolarization ratio $D_{avg}$ is less than about 5%, less than about 3%, less than about 2%, or less than about 1%. In some embodiments, a ratio of the average depolarization ratio $D_{avg}$ to the average optical haze $H_{avg}$ is less than about 0.1. In some embodiments, the ratio of the average depolarization ratio $D_{avg}$ to the average optical haze $H_{avg}$ is between about 0.005 and about 0.01.

The optical film 120 may have a minimum value of the optical haze H in order to scatter the incident light $I_1$ in the first wavelength range R1 (i.e., the visible wavelength range). Such scattering by the optical film 120 may be provided in the display system 100 (shown in FIG. 1) to reduce optical artifacts, such as reflective moiré. However, since the optical film 120 scatters the incident light $I_1$ in the first wavelength range R1 with a low value of the depolarization ratio D, the incident light $I_1$ may undergo minimal change or scrambling in the polarization state after passing through the optical film 120. This may minimize an absorption of light in the different polarization state (i.e., the first polarization state P1) by the absorbing polarizer 150, thereby improving an overall efficiency of the display system 100. Therefore, the optical film 120 may have minimal impact on an overall brightness of the display system 100. Further, an additional component, such as an additional reflective polarizer, may not be required between the optical film 120 and the absorbing polarizer 150 due to the inclusion of the optical film 120. The display system 100 including the optical film 120 may therefore have lower thickness and reduced cost.

In some embodiments, for at least the second wavelength W2 in the second wavelength range R2 from about 800 nm to about 1500 nm, the optical film 120 transmits at least about 60% of the incident light $I_2$ for each of the first polarization state P1 and the second polarization state P2. In some other embodiments, for at least the second wavelength W2 in the second wavelength range R2 from about 800 nm to about 1500 nm, the optical film 120 transmits at least about 70%, at least about 80%, at least about 90%, at least about 95%, or at least about 98% of the incident light $I_2$ for each of the first polarization state P1 and the second polarization state P2. The optical film 120 may substantially transmit the incident light $I_2$ in the second wavelength range R2 irrespective of a polarization state and an angle of incidence of incident light $I_2$. Similarly, light incident on the second major surface 234 of the optical film 120 and in the second wavelength range R2 may be substantially transmitted by the optical film 120 irrespective of a polarization state and an angle of incidence of the incident light. Therefore, for a given light in the second wavelength range R2, the optical film 120 may exhibit similar optical properties irrespective of the light being incident on the first major surface 232 or the second major surface 234.

In some embodiments, for the second wavelength R2 from about 800 nm to about 1500 nm, the optical film 120 has an average optical transmittance of at least about 60% of the incident light $I_2$ for each of the first and second polarization states P1, P2. In some other embodiments, for the second wavelength R2 from about 800 nm to about 1500 nm, the optical film 120 has the average optical transmittance of at least about 70%, at least about 80%, at least about 90%, at least about 95%, or at least about 98% of the incident light $I_2$ for each of the first and second polarization states P1, P2.

In some embodiments, for at least the second wavelength W2 in the second wavelength range R2, the optical film 120 has a scattering ratio S of less than about 30%, less than about 25%, less than about 20%, or less than about 15%. In some embodiments, for a predetermined wavelength of light or a predetermined range of wavelengths and for substantially normal incident light, the scattering ratio S may be defined as a ratio of diffusely transmitted light exiting the optical film 120 to total light (including specular transmitted light) exiting the optical film 120. Total light $T_{total}$ exiting the optical film 120 may be expressed as:

$$T_{total} = T_{diff} + T_{spec} \quad \text{[Equation 1]}$$

where $T_{spec}$ is total light from specular transmission (light exiting the optical film 120 with an angle of less than about 5 degrees from normal), and $T_{diff}$ is total light from diffuse transmission (light exiting the optical film 120 with an angle of greater than about 5 degrees from normal). The terms $T_{total}$, $T_{diff}$, $T_{spec}$ may be measured as intensities of the respective lights. The scattering ratio S may then be defined as:

$$S = T_{diff}/T_{total} \quad \text{[Equation 2]}$$

A value of the scattering ratio S of the optical film 120 for the incident light $I_2$ in the second wavelength range R2 (i.e., IR wavelength range) may be significantly lower than a value of the scattering ratio S for the incident light $I_1$ in the first wavelength range R1 (i.e., visible wavelength range). The optical film 120 may therefore substantially transmit light in the second wavelength R2 with significantly low scattering. As such, the optical film 120 may be substantially transparent to the incident light $I_2$ in the first wavelength range R1. Further, the incident light $I_2$ in the second wavelength range R2 may undergo substantially specular transmission through the optical film 120.

In some embodiments, for the second wavelength range R2, the optical film 120 has an average scattering ratio $S1_{avg}$ of less than about 30%, less than about 25%, less than about 20%, or less than about 15%.

Referring to FIGS. 1 and 7, light from the second light source 146 may therefore travel through the optical film 120 toward the predetermined fingerprint sensing area 172 with minimal scattering. Similarly, light from the finger 174 can travel through the optical film 120 to the optical sensor 170 with minimal scattering. This may allow the optical sensor 170 to be provided under the reflector 142 (shown in FIG.

1). Such a placement of the optical sensor 170 may further enable the optical sensor 170 to be completely hidden from a view of the user 102 (shown in FIG. 1). Furthermore, this may permit a reduction in a bezel size of display system 100 (shown in FIG. 1) and may enable removal of other user interface devices from the display system 100 (e.g., a visible fingerprint sensor or a control button).

Figure 8:
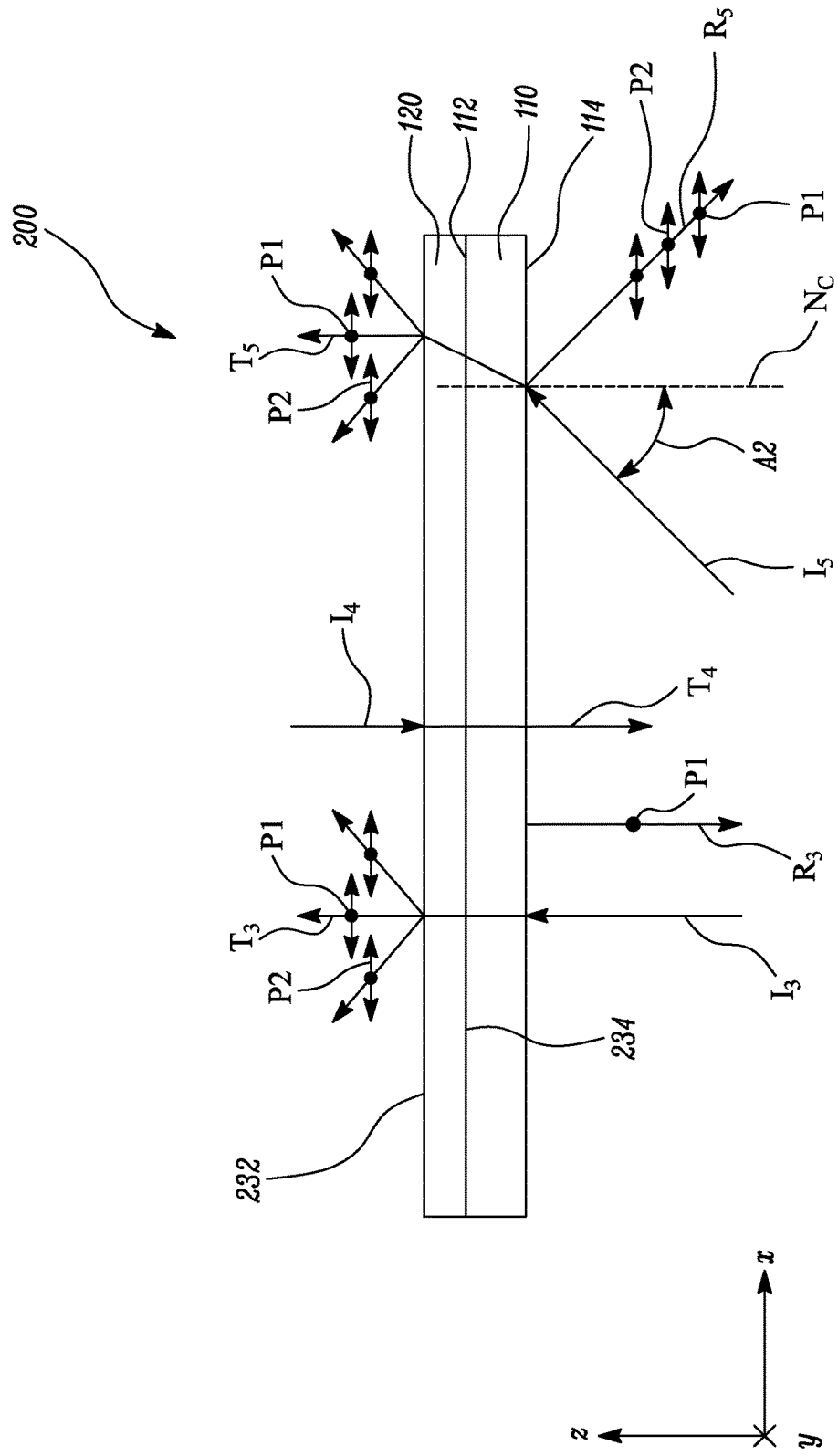
FIG. 8 illustrates a schematic view of the optical construction, according to an embodiment of the present disclosure.

FIG. 8 illustrates a schematic view the optical construction 200 including the reflective polarizer 110 and the optical film 120. As explained above, the optical film 120 may scatter an incident light of certain wavelengths (such as, wavelengths in the first wavelength range R1). However, an incident light in other wavelengths (such as, wavelengths in the second wavelength range R2) may undergo substantially specular transmission through the optical film 120. Further, the reflective polarizer 110 may act as a collimating reflective polarizer for certain wavelengths, such as, wavelengths in the first wavelength range R1.

As shown in FIG. 8, a substantially normal incident light $I_3$ is incident on the second major surface 114 of the reflective polarizer 110, while a substantially normal incident light $I_4$ is incident on the first major surface 232 of the optical film 120. An obliquely incident light $I_5$ having an incident angle A2 relative to a normal $N_C$ is also incident on the second major surface 114 of the reflective polarizer 110. However, the incident light $I_4$ may have any angle of incidence. In some embodiments, the incident light $I_4$ may be reflected from the finger 174 (shown in FIG. 1) placed in the predetermined fingerprint sensing area 172 (shown in FIG. 1). Further, the incident light $I_4$ may alternatively be incident on the second major surface 114 of the reflective polarizer 110. In such cases, the incident light $I_4$ may originate from the at least one second light source 146 (shown in FIG. 1). Further, each of the incident lights $I_3$, $I_4$ and Is may have an unknown or arbitrary polarization state or distribution of polarization states. Each of the incident lights $I_3$ and Is lies in the first wavelength range R1, while the incident light $I_4$ lies in the second wavelength range R2.

The reflective polarizer 110 and the optical film 120, in combination, are configured to transmit a portion of the incident light $I_3$ as a scattered transmitted light $T_3$. The scattered transmitted light $T_3$ may be substantially in the second polarization state P2. In some embodiments, the scattered transmitted light $T_3$ may also include light in the first polarization state P1 due to scattering by the optical film 120. However, the amount of light in the first polarization state P1 may not be significant as compared to the amount of light in second polarization state P2 due to a low value of the depolarization ratio D of the optical film 120. The reflective polarizer 110 and the optical film 120, in combination, are further configured reflect a portion of the incident light $I_3$ as a reflected light $R_3$. The reflected light $R_3$ may be substantially in the first polarization state P1. The reflective polarizer 110 and the optical film 120, in combination, are further configured to substantially transmit the incident light $I_4$ as a transmitted light $T_4$ for each of the first and second polarization states P1, P2. The reflective polarizer 110 and the optical film 120, in combination, are further configured to substantially reflect the incident light $I_5$ as a reflected light $R_5$ for each of the first and second polarization states P1, P2.

In some embodiments, for the substantially normally incident light $I_3$ and for at least the first wavelength W1 in the first wavelength range R1, the optical construction 200 reflects at least about 60% of the substantially normally incident light $I_3$ for the first polarization state P1, and transmits and scatters at least about 40% of the normally incident light $I_3$ for the second polarization state P2. In some other embodiments, for the substantially normally incident light $I_3$ and for at least the first wavelength W1 in the first wavelength range R1, the optical construction 200 reflects at least about 70%, at least about 80%, at least about 90%, at least about 95%, or at least about 98% for the first polarization state P1. In some other embodiments, for the substantially normally incident light $I_3$ and for at least the first wavelength W1 in the first wavelength range R1, the optical construction 200 configured to scatter the incident light $I_3$ for the second polarization state P1. The optical construction 200 may scatter the normally incident light $I_3$ with a low value of the depolarization ratio D.

In some embodiments, for the substantially normally incident light $I_3$ and for the first wavelength range R1, the optical construction 200 has an average optical reflectance of at least about 60% for the first polarization state P1 and an average optical transmittance of at least about 40% for the second polarization state P2. In some other embodiments, for the substantially normally incident light $I_3$ and the first wavelength range R1, the optical construction 200 has the average optical reflectance of at least about 70%, at least about 80%, at least about 90%, at least about 95%, or at least about 98% for the first polarization state P1.

In some embodiments, for the substantially obliquely incident light $I_5$ having the incident angle A2 of at least about 45 degrees and for at least the first wavelength W1 in the first wavelength range R1, the optical construction 200 reflects at least about 60% of the obliquely incident light $I_5$ for each of the first polarization state P1 and the second polarization state P2. In some other embodiments, for the substantially obliquely incident light $I_5$ having the incident angle A2 of at least about 45 degrees and for at least the first wavelength W1 in the first wavelength range R1, the optical construction 200 reflects at least about 70%, at least about 80%, at least about 90%, at least about 95%, or at least about 98% of the obliquely incident light $I_5$ for each of the first polarization state P1 and the second polarization state P2.

In some embodiments, for the substantially obliquely incident light $I_5$ having the incident angle A2 of at least about 45 degrees and for the first wavelength range R1, the optical construction 200 has an average optical reflectance of at least about 60% for each of the first polarization state P1 and the second polarization state P2. In some other embodiments, for the substantially obliquely incident light $I_5$ having the incident angle A2 of at least about 45 degrees and for the first wavelength range R1, the optical construction 200 has the average optical reflectance of at least about 70%, at least about 80%, at least about 90%, at least about 95%, or at least about 98% for each of the first polarization state P1 and the second polarization state P2.

In some embodiments, the reflective polarizer 110 and the optical film 120, in combination, are configured to transmit a portion of the incident light $I_5$ as a scattered transmitted light $T_5$. However, a major portion of the incident light $I_5$ is substantially reflected for each of the first polarization state P1 and the second polarization state P2. The scattered transmitted light $T_3$ may be substantially in the second polarization state P2. In some embodiments, the scattered transmitted light $T_3$ may also include light in the first polarization state P1 due to scattering by the optical film 120. However, the amount of light in the first polarization state P1 may not be significant as compared to the amount of light in second polarization state P2 due to a low value of the depolarization ratio D of the optical film 120.

Referring now to FIGS. 1 and 8, the reflective polarizer 110 and the optical film 120 (and other layers, such as the optical diffuser 130) may be designed to have a low scattering ratio (i.e., low scattering) for light in the second wavelength range R2 (i.e., IR wavelength range), such that incident light in the second wavelength range R2 may be substantially transmitted through the display system 100. This may enable the optical sensor 170 to detect an image of the fingerprint with high clarity.

In some embodiments, for the substantially normally incident light $I_4$ and for at least the second wavelength W2 in the second wavelength range R2 from about 800 nm to about 1500 nm, each of the reflective polarizer 110 and the optical film 120 transmits at least about 60% of the incident light $I_4$ for each of the first polarization state P1 and the second polarization state P2. In some other embodiments, for the substantially normally incident light $I_4$ and for at least the second wavelength W2 in the second wavelength range R2 from about 800 nm to about 1500 nm, each of the reflective polarizer 110 and the optical film 120 transmits at least about 70%, at least about 80%, at least about 90%, at least about 95%, or at least about 98% of the incident light $I_4$ for each of the first polarization state P1 and the second polarization state P2.

In some embodiments, for the substantially normally incident light $I_4$ and for at least the second wavelength W2 in the second wavelength range R2 from about 800 nm to about 1500 nm, the reflective polarizer 110 and the optical film 120, in combination, transmit at least about 60% of the incident light $I_4$ for each of the first polarization state P1 and the second polarization state P2. In some other embodiments, for the substantially normally incident light $I_4$ and for at least the second wavelength W2 in the second wavelength range R2 from about 800 nm to about 1500 nm, the reflective polarizer 110 and the optical film 120, in combination, transmit at least about 70%, at least about 80%, at least about 90%, at least about 95%, or at least about 98% of the incident light $I_4$ for each of the first polarization state P1 and the second polarization state P2. In some embodiments, light incident on the second major surface 114 of the reflective polarizer 110 and in the second wavelength range R2 may also be substantially transmitted by the reflective polarizer 110 and the optical film 120, in combination.

In some embodiments, for the second wavelength range R2 from about 800 nm to about 1500 nm, the reflective polarizer 110 and the optical film 120, in combination, have an average optical transmittance $T1_{avg}$ of at least about 60% for each of the first polarization state P1 and the second polarization state P2.

In some other embodiments, for the second wavelength range R2 from about 800 nm to about 1500 nm, the reflective polarizer 110 and the optical film 120, in combination, have an average optical transmittance $T1_{avg}$ of at least about 70%, at least about 80%, at least about 90%, at least about 95%, or at least about 98% for each of the first polarization state P1 and the second polarization state P2. In some embodiments, for the second wavelength range R2, the reflective polarizer 110 and the optical film 120, in combination, have an average scattering ratio $S_{avg}$ of less than about 30%, less than about 25%, less than about 20%, or less than about 15%.

The optical construction 200 including the reflection polarizer 110 and the optical film 120 may act as a collimating reflective polarizer that scatters light transmitted toward the display panel 160 (shown in FIG. 1) with a low value of the depolarization ratio D. Scattering of light may minimize or prevent optical artifacts, such as reflective moiré. Further, the low value of the depolarization ratio D may minimize an impact on the overall brightness of the display system 100. Moreover, the optical construction 200 may be substantially transparent to light in the second wavelength range R2, thereby having minimal interference with fingerprint sensing and identification.

Figure 9:
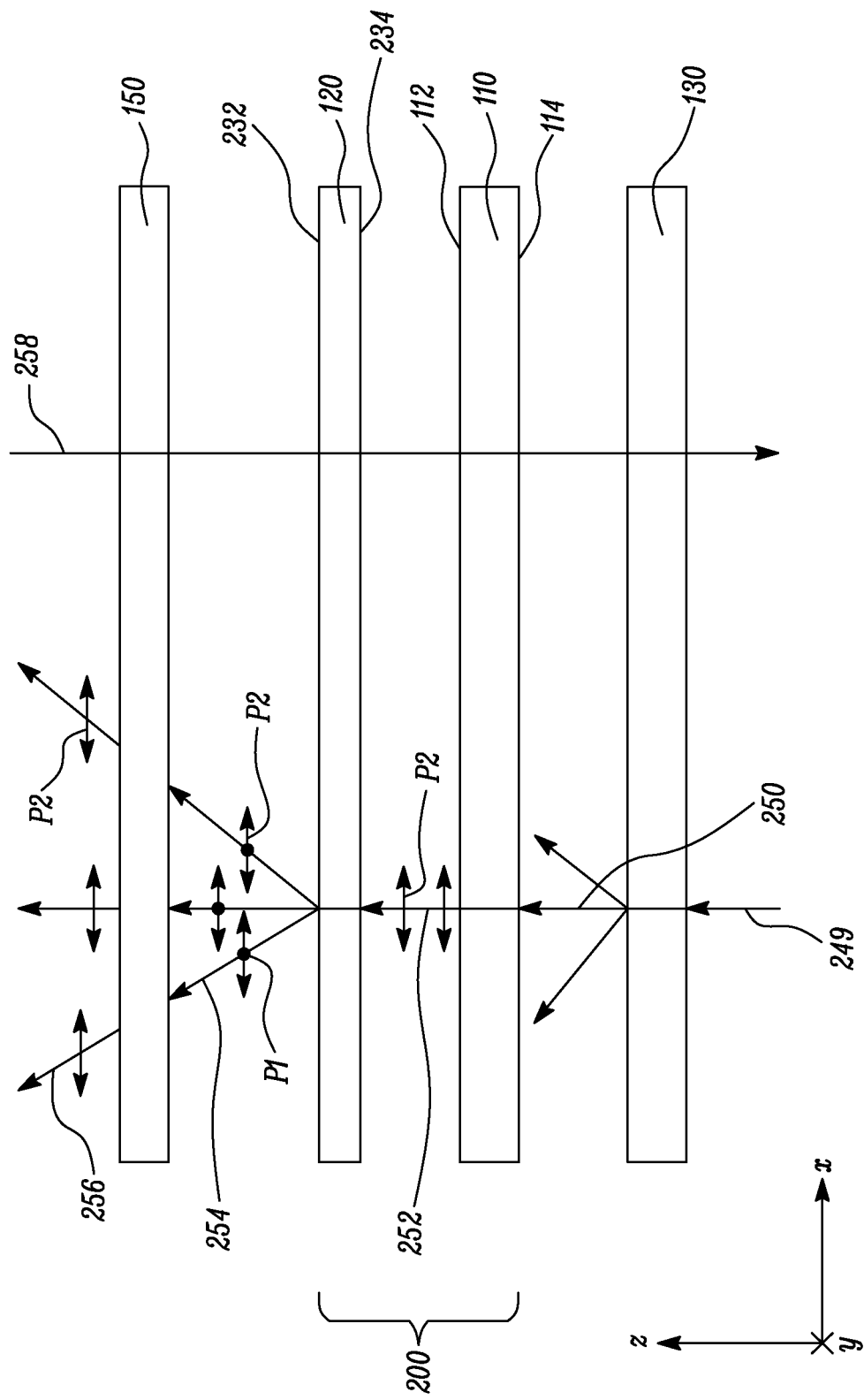
FIG. 9 illustrates an exploded schematic view of the optical diffuser, the reflective polarizer, the optical film, and an absorbing polarizer, according to an embodiment of the present disclosure.

FIG. 9 illustrates a schematic exploded view of the optical diffuser 130, the reflective polarizer 110, the optical film 120, and the absorbing polarizer 150. As shown in FIG. 9, the optical diffuser 130 receives an incident light 249. In some embodiments, the incident light 249 may be in the first wavelength range R1. The optical diffuser 130 may receive the incident light 249 from the lightguide 140. For at least the first wavelength W1 in the first wavelength range R1, the optical diffuser 130 is configured to emit a scattered light 250. The optical diffuser 130 may scatter the incident light 249 to emit the scattered light 250. The incident light 249 may be incident at any incident angle on the optical diffuser 130. The optical diffuser 130 is disposed adjacent to the second major surface 114 of the reflective polarizer 110. The incident light 249 and the scattered light 250 may have an unknown or arbitrary polarization state or distribution of polarization states. In some embodiments, the optical diffuser 130 is configured to scatter the incident light 249 for each wavelength in the first wavelength range R1. In some cases, the incident light 249 may additionally or alternatively include one or more wavelengths in the second wavelength range R2. In some embodiments, the optical diffuser 130 is configured to transmit at least about 60% of the incident light 249 for each wavelength in the second wavelength range R2. In some embodiments, the optical diffuser 130 is configured to transmit at least about 70%, at least about 80%, at least about 90%, or at least about 95% of the incident light 249 for each wavelength in the second wavelength range R2.

The reflective polarizer 110 is configured to receive the scattered light 250 and transmit at least a portion of the scattered light 250 as a transmitted polarized light 252. The scattered light 250 is received by the reflective polarizer 110 at the second major surface 114. The transmitted polarized light 252 exits from the first major surface 112 of the reflective polarizer 110. The transmitted polarized light 252 may substantially include light of the second polarization state P2. A portion (not shown) of the scattered light 250 may be reflected by the reflective polarizer 110 for recycling. The reflective polarizer 110 may transmit the scattered light 250 that is substantially normally incident on the second major surface 114. The reflected light corresponding to the transmitted polarized light 252 may substantially include light of the first polarization state P1. In some embodiments, the reflective polarizer 110 may also substantially reflect the scattered light 250 that is obliquely incident at an incidence angle of at least about 45 degrees on the second major surface 114 for each of the first and second polarization states P1, P2. The reflected light corresponding to the obliquely incident scattered light 250 may include light in both first and second polarization states P1, P2.

The optical film 120 is disposed on the first major surface 112 of the reflective polarizer 110. The optical film 120 is configured to receive and transmit the transmitted polarized light 252 as a diffused polarized light 254 having the optical haze H and the depolarization ratio D. The optical haze H may be referred to as transmission haze. The diffused polarized light 254 may substantially have the second polarization state P2. The diffused polarized light 254 may also include light in the first polarization state P1, however, the amount of light in the first polarization state P1 may not be as significant as compared to the amount of light in the second polarization state P2 due to a low value of the depolarization ratio D. In some embodiments, a ratio of the depolarization ratio D to the optical haze H is less than about 0.1.

Light received and transmitted by the optical film 120 may include specular transmission as well. However, only diffused polarized light 254 is shown for the purpose of illustration. Also, the reflective polarizer 110 is configured to function as a collimating layer and light exiting the reflective polarizer 110 may be substantially perpendicular to the first major surface 112. Therefore, a portion of the scattered light 250 may be transmitted as the transmitted polarized light 252.

The optical film 120 of the present disclosure may exhibit a low value of the depolarization ratio D. Thus, the polarization state of the transmitted polarized light 252 incident on the optical film 120 may remain substantially unchanged after being transmitted through the optical film 120 as the diffused polarized light 254. In some embodiments, the optical film 120 may preserve the polarization state of the transmitted polarized light 252, while providing the optical haze H required for minimizing or eliminating optical artifacts (e.g., reflective moiré).

In some embodiments, the absorbing polarizer 150 is configured to receive the diffused polarized light 254 from the optical film 120 and transmit at least a portion of the diffused polarized light 254 as a transmitted polarized light 256. The transmitted polarized light 256 may be received by the display panel 160 (shown in FIG. 1). The transmitted polarized light 256 may substantially have the second polarization state P2.

Due to the low value of the depolarization ratio D of the optical film 120, the diffused polarized light 254 exiting the optical film 120 is substantially in the second polarization state P2. Therefore, the absorbing polarizer 150 may absorb only a minimal amount of the diffused polarized light 254 received from the optical film 120. As a result, the optical haze H provided by the optical film 120 may have a minimal impact on an overall brightness of the display system 100. This may prevent the need for an additional reflective polarizer between the optical film 120 and the absorbing polarizer 150. The display system 100 including the optical film 120 may therefore have reduced thickness and cost.

Further, each of the optical diffuser 130, the reflective polarizer 110, the optical film 120 and the absorbing polarizer 150 may substantially transmit an incident light 258 in the second wavelength range R2 irrespective of the polarization state and an angle of incidence of the incident light 258. Therefore, the optical haze H provided by the optical film 120 may not interfere with fingerprint imaging and sensing of the display system 100. In the illustrated embodiment, the incident light 258 travels in a direction from the absorbing polarizer 150 to the optical diffuser 130. In some embodiments, the incident light 258 may be reflected from the finger 174 (shown in FIG. 1) placed in the predetermined fingerprint sensing area 172 (shown in FIG. 1). In some embodiments, light in the second wavelength range R2 may also be incident on the optical diffuser 130 and travel in a direction opposite to that of the incident light 258. Such light may also be substantially transmitted by the optical diffuser 130, the reflective polarizer 110, the optical film 120 and the absorbing polarizer 150 irrespective of the polarization state and an angle of incidence. Further, such light may originate from the at least one second light source 146 (shown in FIG. 1).

The reflective polarizer 110 may act as a collimating film, thereby replacing conventional microstructure-based collimating films, such as prism films. Such microstructure-based collimating films may also refract light in the second wavelength range R2, thereby interfering with fingerprint imaging and sensing. In contrast, the reflective polarizer 110 may be substantially transparent to light in the second wavelength range R2. The optical film 120 may enable the reflective polarizer 110 to be used in the display system 100 without generating optical artifacts, such as reflective moiré.

In some embodiments, for a substantially normally incident light and for the first wavelength W1 in the first wavelength range R1, the absorbing polarizer 150 absorbs at least about 60% of the incident light for the first polarization state P1 and transmits at least about 40% of the incident light for the second polarization state P2. In some embodiments, for the second wavelength W2 in the second wavelength range R2, the absorbing polarizer 150 transmits at least about 60% of an incident light for each of the first polarization state P1 and the second polarization state P2. In some embodiments, the absorbing polarizer 150 may be made of a polymeric material.

Figures 10A, 10B:
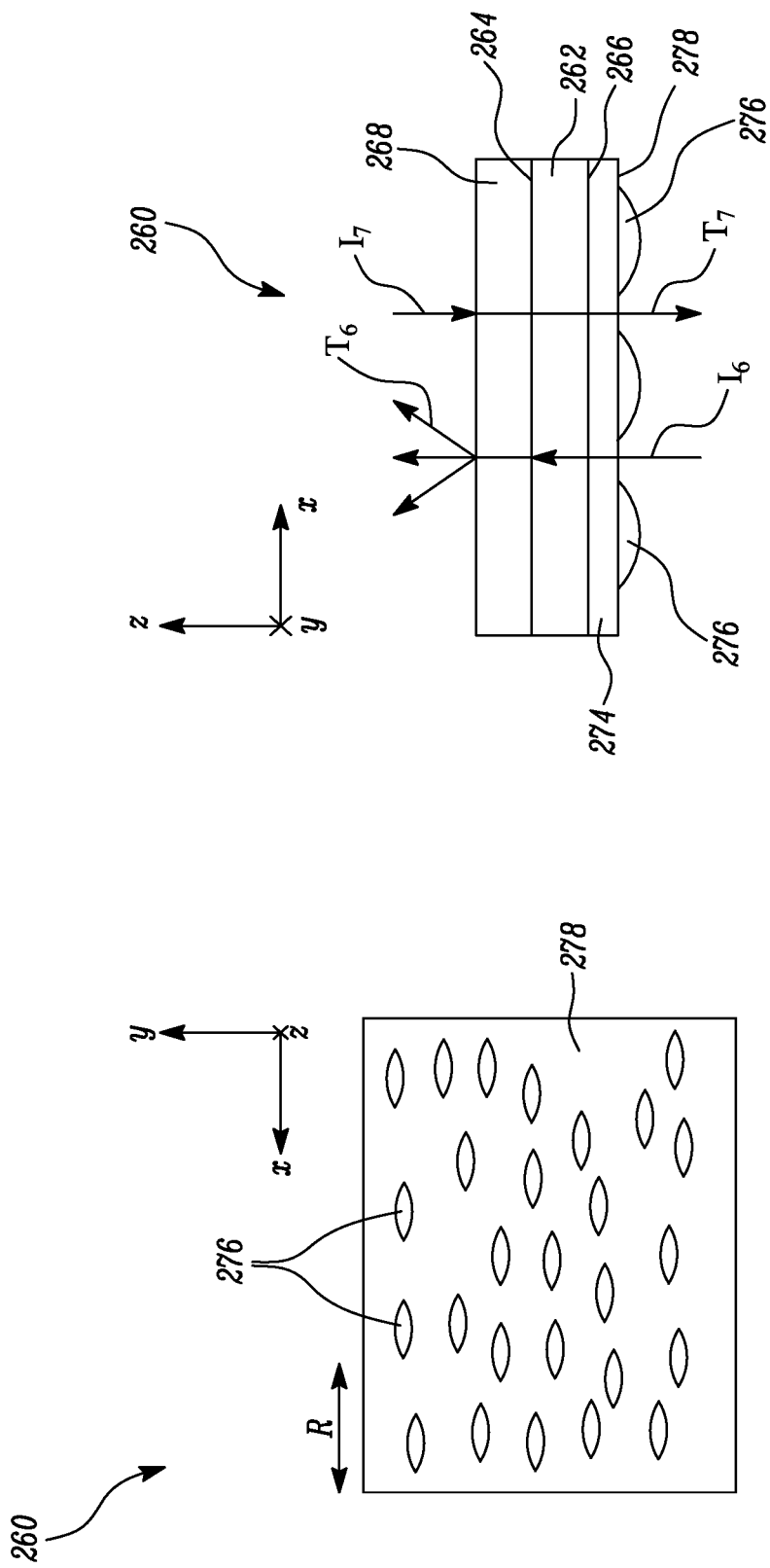
FIGS. 10A and 10B illustrate schematic bottom and sectional views, respectively, of an optical construction, according to an embodiment of the present disclosure.

FIGS. 10A and 10B illustrate different views of an optical construction 260. FIG. 10A shows a schematic bottom view of the optical construction 260. FIG. 10B shows a schematic sectional view of the optical construction in the x-z plane. In some embodiments, the optical construction 260 may correspond to the optical diffuser 130 of FIG. 1. Further, the optical construction 260 may be substantially similar in structure to the optical diffuser 130 of FIGS. 5A and 5B.

Referring to FIGS. 10A and 10B, the optical construction 260 includes a substrate layer 262 including a first major surface 264 and a second major surface 266. The first major surface 264 and the second major surface 266 are substantially disposed along the x-y plane. The optical construction 260 further includes an optical film 268 disposed on the first major surface 264 of the substrate layer 262. The optical film 268 may be similar to the diffusive optical film 246 (shown in FIG. 5B). In some embodiments, the optical film 268 includes a single layer.

The optical construction 260 further includes an optical layer 274 disposed on the second major surface 266 of the substrate layer 262. In some embodiments, the optical layer 274 is coated on the second major surface 266 of the substrate layer 262. The optical layer 274 includes a plurality of spaced apart elongated structures 276 on at least one major surface 278 thereof. The at least one major surface 278 is substantially disposed along the x-y plane. The elongated structures 276 may be substantially similar to the elongated structures 242 of the optical diffuser 130 (shown in FIGS. 5A and 5B). The elongated structures 276 are elongated along the same first direction R and arranged at a substantially uniform density across the major surface 278.

For substantially normally incident light $I_6$ and for at least the first wavelength W1 in the first wavelength range R1 from about 400 nm to about 700 nm, the optical film 268 has an optical haze of at least about 60%. The optical film 268 may transit the incident light $I_6$ as a transmitted light $T_6$. In some other embodiments, the optical film 268 has an optical haze of at least about 70%, at least about 80%, at least about 90%, at least about 95%, or at least about 98% for substantially normally incident light $I_6$ and for at least the first wavelength W1 in the first wavelength range R1.

For at least the second wavelength W2 in the second wavelength range R2 from about 800 nm to about 1500 nm, each of the substrate layer 262, the optical film 268, and the optical layer 274 transmits at least about 60% of the incident light $I_7$ as a transmitted light $T_7$ for each of the first polarization state P1 and the orthogonal second polarization state P2. In some other embodiments, the optical film 268 transmits at least about 70%, at least about 80%, at least about 90%, or at least about 95% of the incident light $I_7$ for each of the first polarization state P1 and the orthogonal second polarization state P2 and for at least the second wavelength W2 in the second wavelength range R2. It should be understood that the incident lights $I_6$, $I_7$ may be incident on any major surface of the optical film 268.

Figure 11:
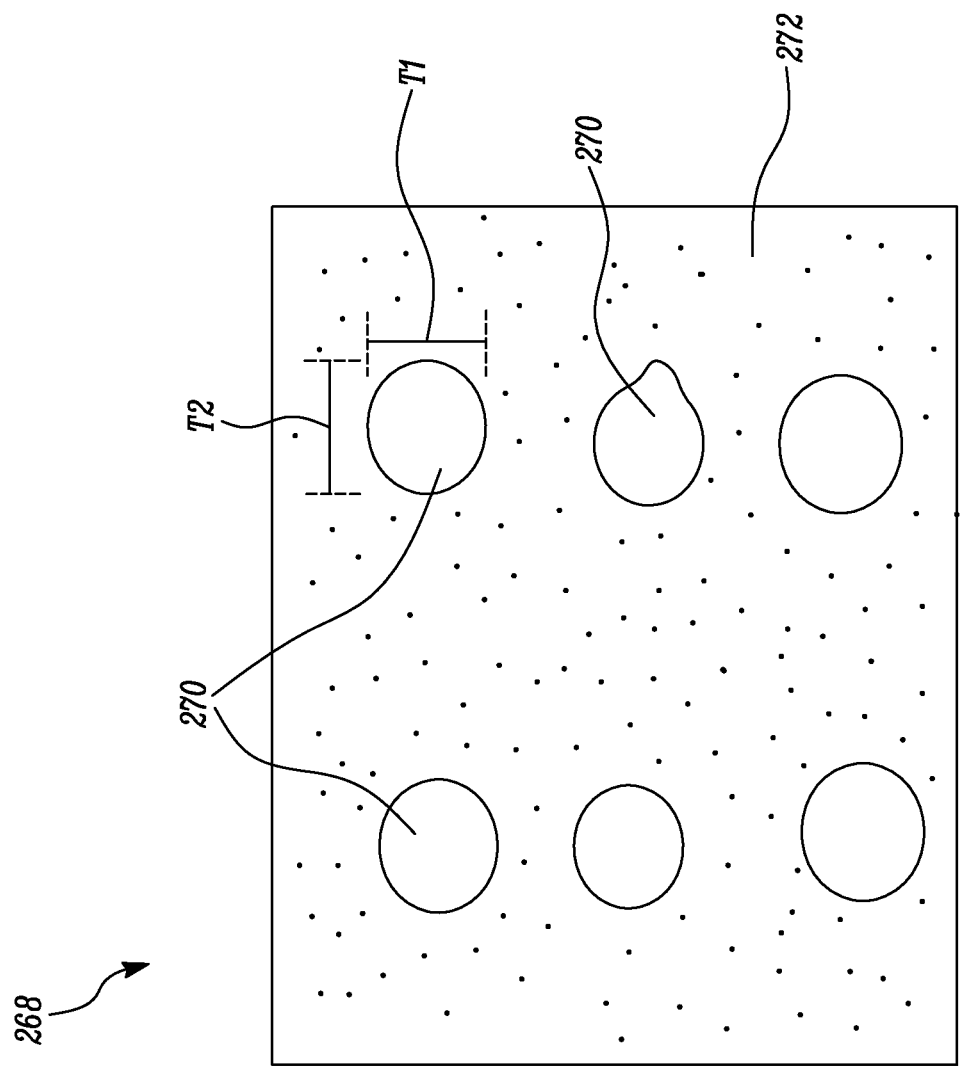
FIG. 11 illustrates a schematic sectional view of an optical film, according to an embodiment of the present disclosure.

FIG. 11 shows a detailed cross-section of the optical film 268. The optical film 268 includes a matrix 272 and a plurality of particles 270 dispersed in the matrix 272. Each of the matrix 272 and the plurality of particles 270 includes a silicone polyoxamide and an acrylate polymer. In some embodiments, the particles 270 are substantially spherical. In some other embodiments, the particles 270 are substantially disk shaped. In some other embodiments, the particles 270 are irregularly shaped. However, the particles 270 may have any shape as per desired application attributes, for example, a substantially elliptical shape, a substantially oval shape, a substantially conical shape, a substantially pyramidal shape, a substantially cuboidal shape, a substantially polyhedral shape, and so forth.

In some embodiments, the particles 270 have an average thickness T1 and a maximum in-plane dimension T2. The maximum in-plane dimension T2 may be measured along the x-y plane. Further, the maximum in-plane dimension T2 is greater than the average thickness T1 by at least 10%. In some other embodiments, the maximum in-plane dimension T2 is greater than the average thickness $T_1$ by at least 20%, at least 30%, at least 40%, at least 50%, at least 60%, or at least 70%.

Figure 12:
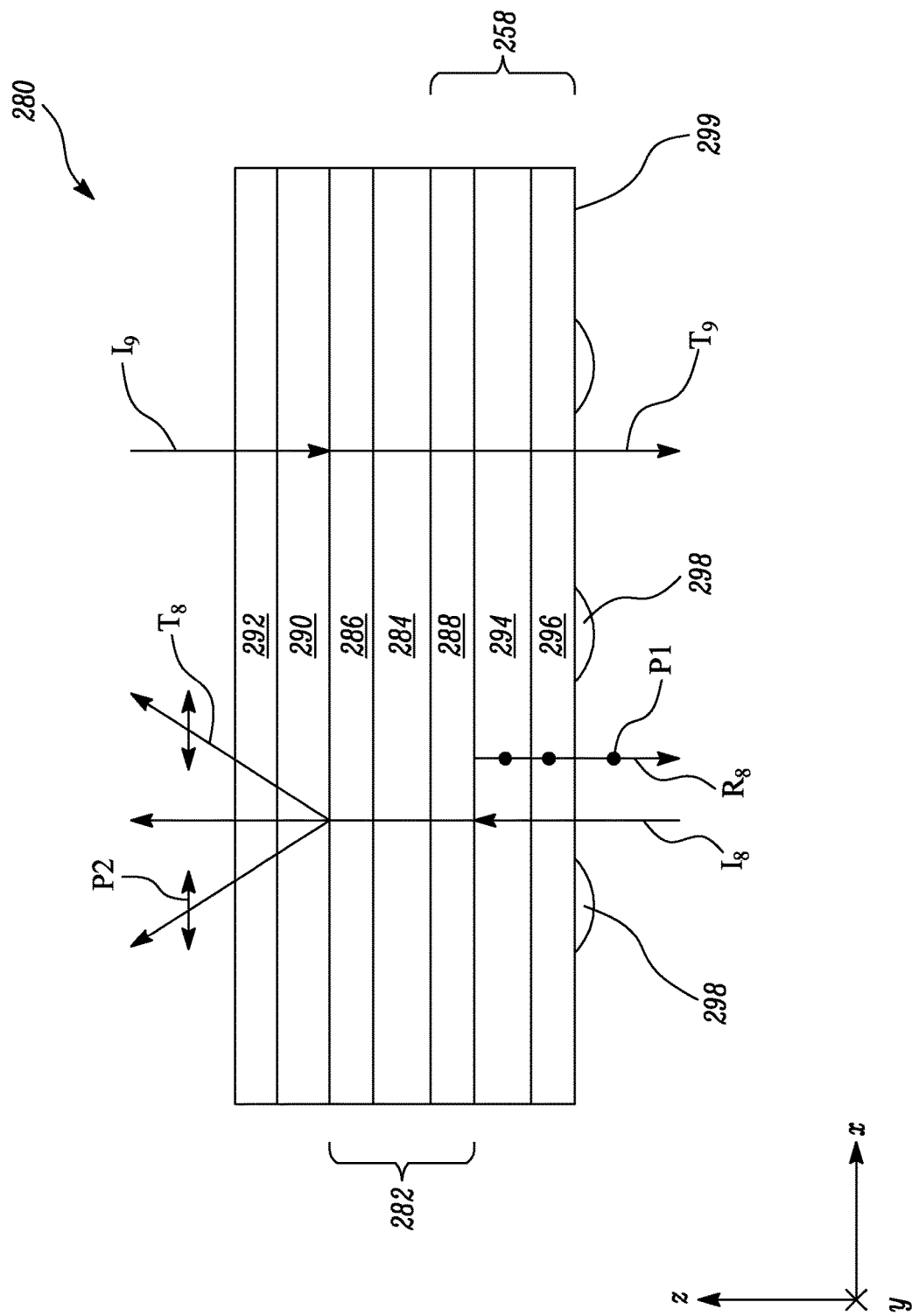
FIG. 12 illustrates a schematic view of a display system, according to an embodiment of the present disclosure.

FIG. 12 illustrates a schematic view of a display system 280. The display system 280 may be substantially similar to the display system 100 of FIG. 1. The display system 280 defines mutually orthogonal x, y, and z-axes. The x and y-axes are in-plane axes of the display system 280, while the z-axis is a transverse axis disposed along a thickness of the display system 280.

The display system 280 includes an optical construction 282 including a reflective polarizer 284 (e.g., the reflective polarizer 110) disposed between first and second optical films 286, 288. The first and second optical films 286, 288 may be substantially similar to the optical film 120 of FIG. 1. Each of the first and second optical films 286, 288 includes a matrix (e.g., the matrix 272) and a plurality of particles (e.g., the particles 270) dispersed in the matrix. Each of the matrix and the plurality of particles includes a silicone polyoxamide and an acrylate polymer. In some embodiments, the first optical film 286 is coated on the reflective polarizer 284.

In some embodiments, the display system 280 further includes an absorbing polarizer 290 (e.g., the absorbing polarizer 150) disposed adjacent to the first optical film 286 opposite to the reflective polarizer 284. In some embodiments, the display system 280 further includes a display panel 292 (e.g., the display panel 160) disposed adjacent to the absorbing polarizer 290 opposite to the first optical film 286. The display system 280 may further include other components as well, for example, a light guide, a reflector, one or more light sources, etc.

The display system 280 further includes a substrate layer 294 (e.g., the substrate layer 262) disposed adjacent to the second optical film 288 opposite to the reflective polarizer 284. In some embodiments, the second optical film 288 is coated on the substrate layer 294. The display system 280 further includes an optical layer 296 (e.g., the optical layer 274) disposed adjacent to the substrate layer 294 opposite to the second optical film 288. In some embodiments, the optical layer 296 is coated on the substrate layer 294. The optical layer 296 includes a plurality of spaced apart elongated structures 298 (e.g., the elongated structures 276 or the elongated structures 242) on at least one major surface 299 thereof. The second optical film 288, the substrate layer 294 and the optical layer 296 may constitute an optical diffuser 258 (e.g., the optical diffuser 130).

For substantially normally incident light $I_8$ and for at least the first wavelength W1 in the first wavelength range R1 from about 400 nm to about 700 nm, the optical construction 282 reflects at least about 60% of the normally incident light $I_8$ as a reflected light $R_8$ for the first polarization state P1 and transmits at least about 40% of the normally incident light $I_8$ as a transmitted light $T_8$ for the orthogonal second polarization state P2. In the illustrated example of FIG. 12, the reflected light $R_8$ is shown displaced from the original position for the purpose of clarity.

In some other embodiments, for the substantially normally incident light $I_8$ and for at least the first wavelength W1 in the first wavelength range R1, the optical construction 282 reflects at least about 70%, at least about 80%, at least about 90%, at least about 95%, or at least about 98% of the normally incident light $I_8$ for the first polarization state P1. In some other embodiments, for the substantially normally incident light $I_8$ and for at least the first wavelength W1 in the first wavelength range R1, the optical construction 282 transmits at least about 45%, at least about 55%, at least about 60%, at least about 70%, at least about 80%, at least about 90%, or at least about 95% of the normally incident light $I_8$ for the second polarization state P2.

For at least the second wavelength W2 in the second wavelength range R2 from about 800 nm to about 1500 nm, the optical construction 282 transmits at least about 60% of an incident light $I_9$ as transmitted light $T_9$ for each of the first polarization state P1 and the second polarization state P2. In some other embodiments, the optical construction 282 may transmit at least about 70%, at least about 80%, at least about 90%, at least about 95%, or at least about 98% of the incident light $I_9$ for at least the second wavelength W2 in the second wavelength range R2.

For at least the first wavelength W1, the optical construction 282 has an optical haze of at least about 60%. In some other embodiments, the optical construction 282 has an optical haze of at least about 70%, at least about 80%, or at least about 90% for at least the first wavelength W1. It should be understood that the incident lights Is, $I_9$ may be incident on any major surface of the optical construction 282.

Figure 13:
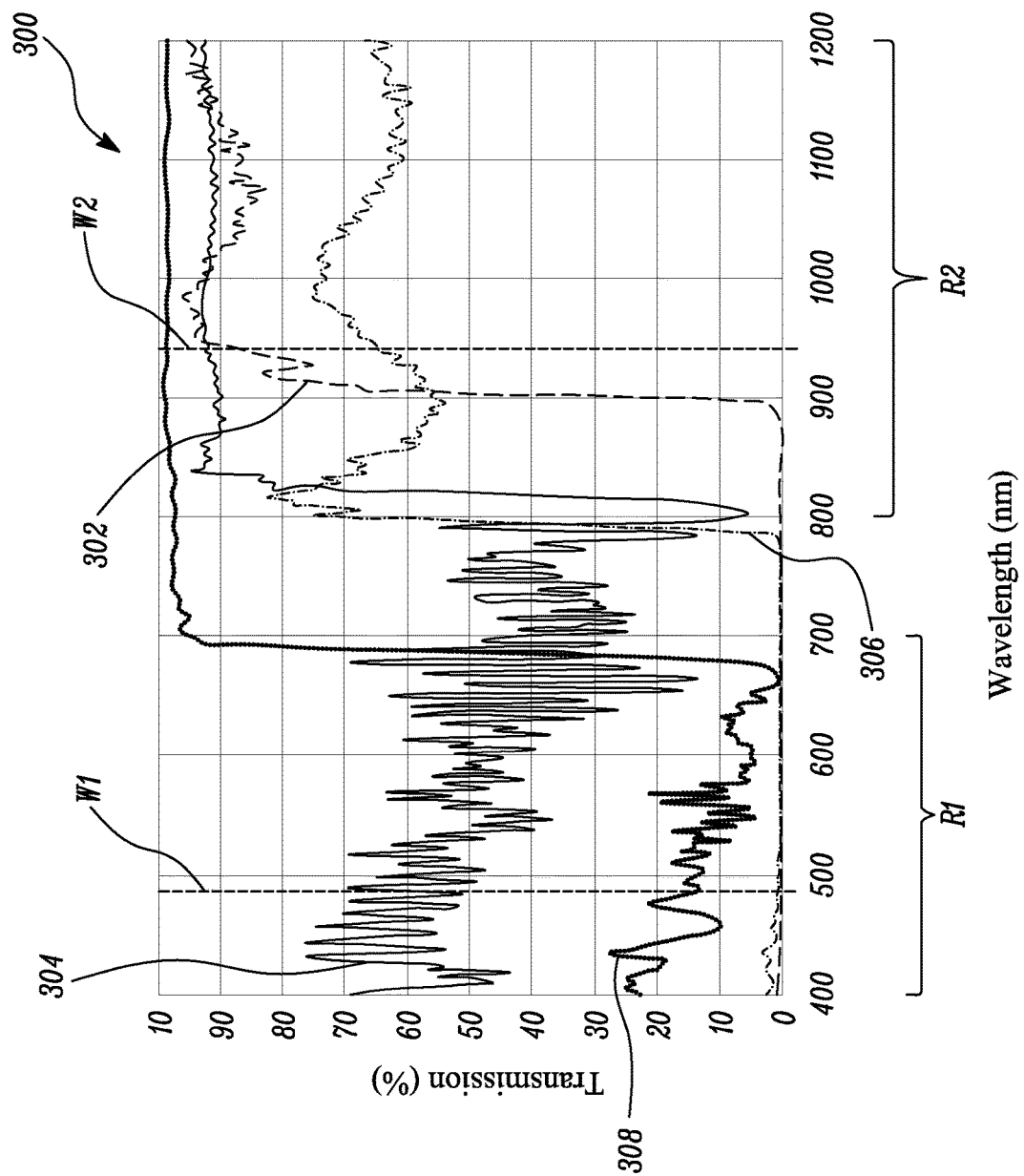
FIG. 13 illustrates an exemplary graph showing transmission percentage versus wavelength for different incident angles and polarization states of light incident on the reflective polarizer.

FIG. 13 illustrates an exemplary graph 300 showing transmission percentage versus wavelength for different incident angles and polarization states of light incident on the reflective polarizer 110. Wavelength is expressed in nanometers (nm) across the first wavelength range R1 and the second wavelength range R2. Specifically, the first wavelength range R1 corresponds to visible wavelength range and the second wavelength range R2 corresponds to the IR wavelength range. It may be noted that the first and second wavelength ranges R1, R2, as shown in FIG. 13, are exemplary in nature and the first and second wavelength ranges R1, R2 may vary based on desired application attributes. For example, the second wavelength range R2 is from about 800 nm to about 1200 nm in FIG. 13. In some other embodiments, the second wavelength range R2 may extend from about 800 nm to about 1500 nm.

Now referring to FIGS. 1 and 13, a curve 302 shows transmission percentage versus wavelength for substantially normally incident light and for the first polarization state P1.

As may be apparent from the graph 300, for a substantially normally incident light and for at least the first wavelength W1 in the first wavelength range R1, the reflective polarizer 110 reflects at least about 60% of the substantially normally incident light for the first polarization state P1. In other words, the reflective polarizer 110 transmits less than about 40% of the substantially normally incident light for the first polarization state P1. In some embodiments, the reflective polarizer 110 may reflect at least about 70%, at least about 80%, at least about 90%, at least about 95%, or at least about 98% of the substantially normally incident light for the first polarization state P1 and for the first wavelength range R1.

A curve 304 shows transmission percentage versus wavelength for substantially normally incident light and for the second polarization state P2. As may be apparent from the graph 300, for a substantially normally incident light and for at least the first wavelength W1 in the first wavelength range R1, the reflective polarizer 110 transmits at least about 40% of the normally incident light for the second polarization state P2. In some other embodiments, the reflective polarizer 110 may transmit at least about 45%, at least about 55%, at least about 60%, at least about 70%, at least about 80%, at least about 90%, or at least about 95% of the normally incident light for the second polarization state P2 and for the first wavelength range R1.

A curve 306 shows transmission percentage versus wavelength for an obliquely incident light having an incident angle of at least about 45 degrees and for the first polarization state P1. Specifically, the curve 306 depicts transmission percentage versus wavelength for an obliquely incident light having an incident angle of about 60 degrees and for the first polarization state P1. As may be apparent from the graph 300, for the obliquely incident light having the incident angle of at least about 45 degrees and for at least the first wavelength W1, the reflective polarizer 110 reflects at least about 60% of the obliquely incident light for the first polarization state P1. In some embodiments, the reflective polarizer 110 may reflect at least about 70%, at least about 80%, at least about 90%, at least about 95%, or at least about 98% of the obliquely incident light for the first polarization state P1 and for the first wavelength range R1.

A curve 308 shows transmission percentage versus wavelength for an obliquely incident light having an incident angle of at least about 45 degrees and for the second polarization state P2. Specifically, the curve 306 depicts transmission percentage versus wavelength for an obliquely incident light having an incident angle of about 60 degrees and for the second polarization state P2. As may be apparent from the graph 300, for the obliquely incident light having the incident angle of at least about 45 degrees and for at least the first wavelength W1, the reflective polarizer 110 reflects at least about 60% of the obliquely incident light for the second polarization state P2. In other words, the reflective polarizer 110 transmits less than about 40% of the normally incident light for the second polarization state P2. In some embodiments, the reflective polarizer 110 may reflect at least about 70%, at least about 80%, at least about 90%, at least about 95%, or at least about 98% of the obliquely incident light for the second polarization state P2 and for the first wavelength range R1.

Further, the reflective polarizer 110 may exhibit substantially high clarity in the second wavelength range R2. As may be apparent from the graph 300, for at least the second wavelength W2 in the second wavelength range R2, the refractive polarizer 110 transmits at least about 60% of an incident light for each of the first polarization state P1 and the second polarization state P2 irrespective of the angle of incidence. Thus, for the curves 302, 304, 306, 308, the refractive polarizer 110 transmits at least about 60% of the incident light in the second wavelength range R2. In some embodiments, the reflective polarizer 110 may transmit at least about 70%, at least about 80%, at least about 90%, at least about 95%, or at least about 98% of the incident light in the second wavelength range R2.

EXAMPLES AND METHODS

The following methods and examples are offered for illustrative purposes only and is not intended to limit the scope of the disclosure in any way. Indeed, various modifications of the disclosure in addition to those shown and described herein will become apparent to those skilled in the art from the foregoing description and the following examples and fall within the scope of the appended claims.

I. Synthesis Methods

Synthesis methods for various polymeric compositions are provided in this section. Various exemplary compositions and reagents are referred to by numbers/alphanumeric symbols. These polymeric compositions may be used to prepare the optical film 120 described above.

Table 1 shown below provides the summary of reagents used in preparation of polymers described below.

TABLE 1

Summary of Reagents

| Name | Chemical Abstracts Service Registry Number | Supplier |
| --- | --- | --- |
| Butyl acrylate (BA) | 141-32-2 | BASF |
| Methyl acrylate (MA) | 96-33-3 | BASF |
| Methyl methacrylate (MMA) | 80-62-6 | Dow Chemical |
| 4-(2-Acryloyloxy-ethoxy) benzophenone (AEBP) | 22421-66-5 | 3M |
| poly(dimethylsiloxane) diamine | 106214-84-0 | 3M |
| Ethylene-bis-oxamic acid trifluoroethyl ester | Trade Secret | 3M |
| Methanol | 67-56-1 | EMD Chemicals |
| 2-isocyanatoethyl methacrylate (IEM) | 30674-80-7 | Sigma Aldrich |
| Cyclohexyl isocyanate | 3173-53-3 | Sigma Aldrich |
| Vazo-67 | 13472-08-7 | FujiFilm Wako Chemicals |
| Ethyl acetate (EtOAc) | 141-78-6 | Eastman |
| 1-Methoxy-2-propanol (1M2P) | 107-98-2 | Dow Chemical |

1. Synthesis of Silicone Polyoxamide Elastomers:
   a. Synthesis of Unfunctionalized Silicone Polyoxamide Elastomer (1-A):

A polydisiloxane polyoxamide elastomer used had a number average molecular weight of about 20,000 g/mole (amine equivalent weight of about 10,000 g/mole), such as those described in the Example 12 of U.S. Pat. No. 8,765,881, the disclosure of which is incorporated herein in its entirety by reference. The final elastomer composition 1-A included about 18% solids.

b. Synthesis of End-Chain Functionalized Silicone Polyoxamide Elastomer (1-B):

A 12 L resin flask was charged with 26.05 g of ethylene-bis-oxamic acid trifluoroethyl ester (as prepared in Example 3 of U.S. Pat. No. 8,765,881), 1478.85 g of poly(dimethylsiloxane) diamine (amine equivalent weight equal to 10,191 g/mole) and 3464.59 g of ethyl acetate. The reaction mixture was stirred at about 70° C. under $N_2$ atmosphere for about 16 hours. The resulting viscous solution was then cooled to 50° C. and further diluted with 2485.08 g of ethyl acetate. 7.46 g of 2-isocyanatoethyl methacrylate was then charged to the resin flask and stirred at about 50° C. under $N_2$ atmosphere for about 2 hours. The resulting reaction mixture was then quenched with 111.83 g of methanol and further diluted with 750.49 g of ethyl acetate to obtain a clear, viscous solution (IV equal to 0.99 dL/gram). The final polymer solution 1-B contained about 18% solids.

c. Synthesis of Mid-Chain Functionalized Silicone Polyoxamide Elastomer (1-C):

A 12 liter (L) resin flask was charged with 24.04 gram (g) of ethylene-bis-oxamic acid trifluoroethyl ester (as prepared in Example 3 of U.S. Pat. No. 8,765,881), 1433.24 g of poly(dimethylsiloxane) diamine (amine equivalent weight equal to 10,540 g/mole) and 3357.30 g of ethyl acetate. The reaction mixture was stirred at about 70° C. under $N_2$ atmosphere for about 16 hours. The resulting viscous solution was then cooled to 50° C. and further diluted with 2407.78 g of ethyl acetate. 0.87 g of cyclohexyl isocyanate was then charged to the resin flask and stirred at about 50° C. under $N_2$ atmosphere for about an hour. 7.22 g of 2-isocyanatoethyl methacrylate was then charged to the resin flask and stirred at about 50° C. under $N_2$ atmosphere for about 2 hours. The resulting reaction mixture was then quenched with 108.35 g of methanol and further diluted with 731.13 g of ethyl acetate to obtain a clear, viscous solution (IV equal to 1.01 dL/gram). The final polymer solution 1-C contained about 18% solids.

Table 2 shown below provides the summary of silicone polyoxamide elastomers prepared using the methods provided above.

TABLE 2

Summary of Kinds of Silicone Polyoxamide Elastomers

| Example # | Type of Elastomer Composition |
|---|---|
| 1-A | Unfunctionalized silicone polyoxamide elastomer |
| 1-B | End-chain functionalized silicone polyoxamide elastomer |
| 1-C | Mid-chain functionalized silicone polyoxamide elastomer |

2. Synthesis of Acrylate Base Polymers (2-A):

To a reactor 239.4 g methyl acrylate (MA), 360 g methyl methacrylate (MMA), 1.2 g 4-(2-Acryloyloxy-ethoxy) benzophenone (AEBP) (50% solids in ethyl acetate), and 713.3 g ethyl acetate was charged. The solution was mixed and heated to 70° C. Then, 0.75 g initiator Vazo-67 (pre-dissolved in 10 g ethyl acetate) was added to the reactor. Oxygen was removed by purging $N_2$ through the solution several times until the polymerization was started. The reaction mixture was kept at 70° C. for 3 hours. Another 1.5 g Vazo-67 (pre-dissolved in 10 g ethyl acetate) was then charged to the solution. $N_2$ was purged to the reaction mixture for three times. The reaction mixture was kept at 70° C. for another 9 hours (total reaction time=12 hours), and then the reaction mixture was heated to 80° C. for over an hour (total reaction time=13 hours). The reaction was held at 80° C. for additional 7 hours (total time 20 hours). After the completion of reaction, the solution was diluted to 20% solids by adding 1202.4 g 1-methoxy-2-propanol and 469.07 g ethyl acetate to obtain 2-A.

Table 3 shown below provides the summary of acrylate base polymer prepared using the method provided above.

TABLE 3

Summary of Acrylate Base Polymers

| | Polymer acrylate composition (wt. %) | | | |
|---|---|---|---|---|
| Example # | BA | MA | MMA | AEBP |
| 2-A | 0 | 39.9 | 60 | 0.1 |

3. Synthesis of Acrylate/Silicone Polyoxamide Hybrid Polymers:

a. Synthesis of Acrylate/Silicone Polyoxamide Hybrid Polymer Using Un-Functionalized Silicone Polyoxamide (3-A):

To a reactor 33.3 g unfunctionalized silicone polyoxamide solution (18% solids in ethyl acetate), 89.7 g butyl acrylate (BA), 30 g MA, 180 g MMA, 0.6 g AEBP (50% solids in ethyl acetate), and 412 g ethyl acetate was charged. The solution was mixed and heated to 70° C. Then, 0.3 g initiator Vazo-67 (pre-dissolved in 10 g ethyl acetate) was then added to the reactor. Oxygen was removed by purging $N_2$ through the solution several times until the polymerization was started. The reaction mixture was kept at 70° C. for 12 hours, and then heated to 80° C. for over an hour. The reaction mixture was then held at 80° C. for additional 7 hours (total reaction time=20 hours). After the reaction was complete, the solution was diluted to 20% solids by adding 613 g 1-methoxy-2-propanol and 163 g ethyl acetate to obtain 3-A.

Table 4 shown below provides the summary of acrylate/silicone polyoxamide hybrid polymer prepared using the method provided above.

TABLE 4

Summary of Acrylate/Silicone Polyoxamide Hybrid Polymers

| | Polymer acrylate composition (wt. %) | | | | Unfunctionalized silicone polyoxamide (wt. %) |
|---|---|---|---|---|---|
| Example # | BA | MA | MMA | AEBP | |
| 3-A | 29.9 | 10 | 60 | 0.1 | 2 | b. Synthesis of acrylate/silicone polyoxamide hybrid polymer using end-chain functionalized silicone polyoxamide (3-B):

To a reactor 83.3 g end-chain functionalized silicone polyoxamide solution (18% solids in ethyl acetate), 89.7 g BA, 30 g MA, 180 g MMA, 0.6 g AEBP (50% solids in ethyl acetate), and 412 g ethyl acetate was charged. The solution was mixed and heated to about 70° C. Then, 0.3 g initiator Vazo-67 (pre-dissolved in 10 g ethyl acetate) was added to the reactor. Oxygen was removed by purging $N_2$ through the solution several times until the polymerization was started. The reaction mixture was kept at 70° C. for 12 hours, and then heated to 80° C. for over an hour. The reaction mixture was then held at 80° C. for additional 7 hours (total reaction time=20 hours). After the reaction was complete, the solution was diluted to 20% solids by adding 562.87 g 1-methoxy-2-propanol and 161.21 g ethyl acetate to obtain 3-B.

Table 5 shown below provides the summary of acrylate/silicone polyoxamide hybrid polymer prepared using the method provided above.

TABLE 5

Summary of Hybrid Polymers Using End-chain Functionalized Silicone Polyoxamide

| Example # | Polymer acrylate composition (wt. %) | | | | End-chain functionalized silicone polyoxamide (wt. %) |
|---|---|---|---|---|---|
| | BA | MA | MMA | AEBP | |
| 3-B | 29.9 | 10 | 60 | 0.1 | 5 | c. Synthesis of Acrylate/Silicone Polyoxamide Hybrid Polymer Using Mid-Chain Functionalized Silicone Polyoxamide (3-C-1):

To a reactor 50 g mid-chain functionalized silicone polyoxamide solution (18% solids in ethyl acetate), 89.7 g BA, 30 g MA, 180 g MMA, 0.6 g AEBP (50% solids in ethyl acetate), and 399 g ethyl acetate was charged. The solution was mixed and heated to 70° C. Then, 0.3 g initiator Vazo-67 (pre-dissolved in 10 g ethyl acetate) was added to the reactor. Oxygen was removed by purging N₂ through the solution several times until the polymerization was started. The reaction mixture was kept at 70° C. for 12 hours, and then heated to 80° C. for over an hour. The reaction mixture was then held at 80° C. for additional 7 hours (total reaction time=20 hours). After the reaction was complete, the solution was diluted to 20% solids by adding 554.23 g 1-methoxy-2-propanol and 152.14 g ethyl acetate to obtain 3-C-1.

Polymers 3-C-1, 3-C-2, 3-C-3, 3-C-4, and 3-C-5 were prepared using the same amount of mid-chain functionalized silicone polyoxamide while varying the proportion of BA, MA, MMA in the acrylate polymer composition. Similar reaction procedures were followed for preparation of 3-C-1, 3-C-2, 3-C-3, 3-C-4, and 3-C-5 as that of 3-C-1. Polymer 3-C-6 had the same acrylate polymer composition as that of 3-C-5 while reducing of amount of mid-chain functionalized silicone polyoxamide to 2%.

Polymers 3-C-7, 3-C-8, 3-C-9, 3-C10 and 3-C-11 were prepared using same acylate polymer composition (2-A) while varying the amounts of mid-chain functionalized silicone polyoxamide. Similar reaction procedures were followed for preparation of polymers 3-C-7, 3-C-8, 3-C-9, 3-C10 and 3-C-11 as that of 3-C-1.

Table 6 shown below provides the summary of acrylate/silicone polyoxamide hybrid polymers prepared above.

TABLE 6

Summary of Hybrid Polymers Using Mid-chain Functionalized Silicone Polyoxamide

| Example # | Polymer acrylate composition (wt. %) | | | | Mid-chain functionalized silicone polyoxamide (wt. %) |
|---|---|---|---|---|---|
| | BA | MA | MMA | AEBP | |
| 3-C-1 | 29.9 | 10 | 60 | 0.1 | 3 |
| 3-C-2 | 19.9 | 20 | 60 | 0.1 | 3 |
| 3-C-3 | 29.9 | 20 | 50 | 0.1 | 3 |
| 3-C-4 | 29.9 | 30 | 40 | 0.1 | 3 |
| 3-C-5 | 29.9 | 10 | 60 | 0.1 | 3 |
| 3-C-6 | 29.9 | 10 | 60 | 0.1 | 2 |
| 3-C-7 | 0 | 39.9 | 60 | 0.1 | 2 |
| 3-C-8 | 0 | 39.9 | 60 | 0.1 | 10 |
| 3-C-9 | 0 | 39.9 | 60 | 0.1 | 15 |
| 3-C-10 | 0 | 39.9 | 60 | 0.1 | 20 |
| 3-C-11 | 0 | 39.9 | 60 | 0.1 | 5 |

Some of the advantages of the disclosed films, layers, constructions, and systems are further illustrated by the following examples. The particular materials, amounts and dimensions recited in below examples, as well as other conditions and details, should not be construed to unduly limit the present invention.

II. Preparation of Collimating Multilayer Film (CMOF)

The CMOF films were prepared as described in PCT Patent Application No. PCT/CN2019/074629, the disclosure of which is incorporated herein in its entirety by reference. Example Film 1 of PCT Patent Application No. PCT/CN2019/074629 was used as a base CMOF.

In an example, two packets of alternating layers of a high refractive index polymer and a low refractive index polymer were separated with a core layer having the low refractive index polymer. Each layer has a thickness of less than about 300 nm. Further, the alternating layers of each packet have a specific layer profile. On each side of an outer high index layer, a few microns thick layer of a low index material was formed as a skin layer (e.g., the first and second skin layers 212, 214) to protect the multilayers and to provide the necessary mechanical stability. One side of some CMOF films used was coated with 5 microns diameter acrylic beads (MX500 from Soken Engineering and Chemicals Co. Ltd., Japan) to provide anti-wetout functionality needed against a diffuser film (e.g., the optical diffuser 130 described above) and the other side was coated with MZ-5HN beads (available from Soken Engineering and Chemicals Co. Ltd., Japan). These CMOF films with both sides coated with beads were designated as D-CMOF (control example). Some CMOF films used in the Examples described below were coated with 5 microns diameter beads (MX500 from Soken Engineering and Chemicals Co. Ltd., Japan) to provide anti-wetout functionality needed against the diffuser film (e.g., the optical diffuser 130 described above) and the other side was left uncoated. These CMOF films with one side coated with beads were designated as S-CMOF. The S-CMOF films may correspond to the reflective polarizer 110 described above. The transmission spectra of the base CMOF films used for the Examples and Comparative Examples are shown in FIG. 10 described above. These spectra were measured using a spectrophotometer equipped with a polarizer with its pass axis parallel to a pass axis of the CMOF films and perpendicular to the pass axis of the CMOF films with an incident light at 0° and 60° orientation with respect to a surface normal.

III. EXAMPLES

Several example films (equivalent to the optical construction 200) were prepared in accordance with embodiments of the description. Examples 1-26 were prepared by coating the polymers (3-C-1 to 3-C-11) prepared above on the base S-CMOF film (equivalent to the reflective polarizer 110). The polymers were synthesized using the components and preparation methods described above. The polymers were prepared using different conditions to yield polymers including 3-C-6, 3-C-11, 3-C-5, 3-C-8, and 2-A as described above.

Polymer solutions were coated on a solvent coaterusing a die coater. Solvents were evaporated by passing a coated web through heated ovens. By adjusting the concentration ofsilicone polyoxamide in the solutions, different dry thickness with several haze levels were obtained.

Examples 1-3 were prepared by coating the polymer 3-C-6 on the base S-CMOF film. Example 4-6 were prepared by coating the polymer 3-C-11 on the base S-CMOF film. Example 7-9 were prepared by coating the polymer 3-C-5 on the base S-CMOF film. Example 10-26 were prepared by coating the base S-CMOF film with a blend of polymer 2-A (0% silicone polyoxamide) and polymer 3-C-8 (10% silicone polyoxamide) at different proportions to get different percentage of silicone polyoxamide in a final polymer solution.

Table 7 below shows concentration of silicone polyoxamide in the corresponding Examples 1-26. For example, Example 12 includes 25% by wt. of polymer 3-C-8 (10% silicone polyoxamide) and 75% by wt. of acrylate polymer 2-A (00% silicone polyoxamide) resulting in an overall silicone polyoxamide composition of 2.5% by wt. in a final polymer solution.

TABLE 7

Concentration of Silicone Polyoxamide in Examples 1-26

| Example | % by wt. of silicone polyoxamide |
|---|---|
| Example 1 | 2.0 |
| Example 2 | 2.0 |
| Example 3 | 2.0 |
| Example 4 | 5.0 |
| Example 5 | 5.0 |
| Example 6 | 5.0 |
| Example 7 | 3.0 |
| Example 8 | 3.0 |
| Example 9 | 3.0 |
| Example 10 | 5.0 |
| Example 11 | 5.0 |
| Example 12 | 2.5 |
| Example 13 | 7.5 |
| Example 14 | 5.0 |
| Example 15 | 8.5 |
| Example 16 | 7.5 |
| Example 17 | 7.5 |
| Example 18 | 5.0 |
| Example 19 | 10.0 |
| Example 20 | 5.0 |
| Example 21 | 5.0 |
| Example 22 | 7.5 |
| Example 23 | 5.0 |
| Example 24 | 5.0 |
| Example 25 | 8.5 |
| Example 26 | 7.5 |

Comparative Example 1

Comparative Example 1 was prepared by coating the polymer or diffusive solution on a surface of the base D-CMOF film with MZ-5HN beads (available from Soken Engineering and Chemicals Co. Ltd., Japan) coated thereon by following the protocol as described in PCT Patent Application No. PCT/CN2019/074629. As described above, the base D-CMOF film also included 5 microns diameter acrylic beads (available as MX500 from Soken Engineering and Chemicals Co. Ltd., Japan) coated on the other surface. Processing parameters, such as mass loading of silica nanoparticles, the photoinitiator, ultraviolet light intensity, rate of curing, thickness of wet film, etc. were adjusted to obtain a total visible haze of approximately 44%. The resulting film has silica nanoparticles bonded together by acrylic polymer with large air voids between them. The film exhibits a large difference between a refractive index of scattering centers and the host.

IV. Measurements and Testing

Details of various measurements and tests conducted on the Examples described above are provided below.

1. Measurement of Thickness of Film and Coatings: Thickness measurements were performed using a drop gauge from Mitutoyo drop gauge (available from Mitutoyo Corporation, Japan). To measure the thickness of the diffusive coating (equivalent to the optical film 120), the thickness of the uncoated base CMOF (e.g., S-CMOF or D-CMOF) was first measured and then subtracted from the total thickness of the diffuse coated CMOF.

2. Measurement of Visible Haze: Visible haze of the Examples was measured using Hazeguard Plus (available from BYK Instrument, Taiwan) with the diffusive coating facing an integrating sphere of the instrument.

3. Measurement of IR Transmission and Scattering Cross-section: Total transmission and diffuse transmission of the Examples were measured by placing the Examples with the diffusive coating facing toward an integrating sphere of a spectrophotometer (UltraScan Pro, available from Hunter Labs, Sweden). Specular transmission was calculated by subtracting diffuse transmission from the total transmission. The scattering cross-section was then calculated as:

$$\text{Scattering Cross-section } (SC) = \frac{\text{Diffuse Transmission}}{\text{Total Transmission}} \times 100\%$$

4. Measurement of Depolarization Ratio: Depolarization ratio was measured by mounting the base CMOF between a uniform backlight source (available as MB-BL6x4 from Metaphase Technologies Inc., Bristol, PA) and a Melles Griot linear polarizer mounted on a rotating stage. A luminosity of the backlight source, as viewed through the linear polarizer, was measured using a spectroradiometer (available as PR650 from Photoresearch Inc., Syracuse, NY) placed at 58 cm from the backlight source. With the base CMOF (coated or uncoated) in place, the linear polarizer was rotated until a pass axis of the linear polarizer was perpendicular to a pass axis of the reflective polarizer as indicated by minimum luminosity measured by the spectroradiometer with observer at 2°. Depolarization ratio was calculated by measuring the luminosity with the CMOF with or without the diffusive coating as:

$$\text{Depolarization Ratio} = \frac{L_{sample}^{perp} - L_{base}^{perp}}{L_{base}^{par} - L_{base}^{perp}} \times 100\%$$

where, $L_{sample}^{perp}$: Measured luminosity when the pass axis of the CMOF with the diffusive coating is perpendicular to the pass axis of the linear polarizer.

$L_{base}^{perp}$: Measured luminosity when the pass axis of the uncoated base CMOF is perpendicular to the pass axis of the linear polarizer.

$L_{base}^{par}$: Measured luminosity when the pass axis of the uncoated base CMOF is parallel to the pass axis of the linear polarizer.

5. Optical Measurement of Brightness, Contrast ratio, and Moiré: Brightness and contrast ratio of a display device using the CMOF with the diffusive coating were measured by using the coated CMOF (equivalent to the optical construction 200) in a smart phone (Redmi, available from Xiaomi Corporation). For comparison, original crossed prisms were replaced with 3M Advanced Structured Optical Composite film (available from 3M Company, St Paul, MN) stack in a backlight unit. The brightness of the display device was measured as a luminosity of a white screen on the display device at maximum brightness settings using a spectroradiometer (available as PR750 from Photoreaserch, Inc., Syracuse, NY) 0.5 m away from the display device with observer at 2 degrees. The contrast ratio was calculated as a ratio between the measured luminosity with the white screen and that with a black screen on the display device. To determine the effect of advanced polarizing film, the measurements were carried out with and without an advanced polarizing film (available as APFv3 from 3M Company, St Paul, MN) laminated on an absorbing polarizer of a Liquid Crystal Module.

The extent to which the diffusive coating on the CMOF eliminates optical artifacts (e.g., moiré) was evaluated by using two qualitative methods. In the first method, the moiré was visually evaluated and ranked on a scale of 0-5 (with 0 being no moiré and 5 being clearly visible moiré). The visual assessment was confirmed by recording a contour plot of the display device using Eldim80 (available from ELDIM, France).

Table 8 below provides optical measurement data for Examples 1-26 and Comparative Example 1 for parameters described above.

TABLE 8

Optical Measurement Data

| Example | % of SP | Bead Size (micron) | Thickness (micron) | % T @ 940 nm | Scattering | Haze (%) | D (%) | Ratio DP/Haze |
|---|---|---|---|---|---|---|---|---|
| Example 1 | 2.0 | 2-5 | 24 | 75.6 | 14.8 | 31.6 | 1.28 | 0.0405 |
| Example 2 | 2.0 | | 17 | 77.7 | 12.2 | 27.2 | 1.20 | 0.0441 |
| Example 3 | 2.0 | | 16 | 77.8 | 11.3 | 25.2 | 1.16 | 0.0460 |
| Example 4 | 5.0 | 0.5 | 23 | 70.1 | 20.6 | 51.8 | 2.64 | 0.0510 |
| Example 5 | 5.0 | | 19 | 72.5 | 17.9 | 46.4 | 2.23 | 0.0481 |
| Example 6 | 5.0 | | 16 | 74.9 | 15.5 | 41.0 | 2.00 | 0.0488 |
| Example 7 | 3.0 | 1-2 | 23 | 68.1 | 21.7 | 50.2 | 1.46 | 0.0291 |
| Example 8 | 3.0 | | 19 | 72.7 | 18.9 | 44.9 | 1.36 | 0.0303 |
| Example 9 | 3.0 | | 16 | 74.9 | 16.5 | 40.2 | 1.26 | 0.0313 |
| Example 10 | 5.0 | | 5 | 77.9 | 11.2 | 24.4 | 0.48 | 0.0197 |
| Example 11 | 5.0 | | 9 | 76.2 | 13.3 | 29.5 | 0.46 | 0.0156 |
| Example 12 | 2.5 | | 16 | 76.4 | 14.0 | 30.4 | 0.66 | 0.0217 |
| Example 13 | 7.5 | | 6 | 76.4 | 14.0 | 32.0 | 0.42 | 0.0131 |
| Example 14 | 5.0 | | 10 | 74.4 | 16.0 | 34.8 | 0.53 | 0.0152 |
| Example 15 | 8.5 | | 6 | 75.0 | 16.0 | 34.4 | 0.46 | 0.0134 |
| Example 16 | 7.5 | | 19 | 73.9 | 16.9 | 35.3 | 0.74 | 0.0210 |
| Example 17 | 7.5 | | 9 | 73.0 | 17.9 | 38.4 | 0.57 | 0.0148 |
| Example 18 | 5.0 | | 12 | 71.3 | 18.4 | 38.5 | 0.82 | 0.0213 |
| Example 19 | 10.0 | | 6 | 73.5 | 17.6 | 38.5 | 0.52 | 0.0135 |
| Example 20 | 5.0 | | 12 | 71.6 | 19.0 | 39.1 | 0.63 | 0.0161 |
| Example 21 | 5.0 | | 14 | 68.2 | 21.3 | 43.2 | 0.74 | 0.0171 |
| Example 22 | 7.5 | | 8 | 68.7 | 21.6 | 44.5 | 0.66 | 0.0148 |
| Example 23 | 5.0 | | 16 | 68.0 | 22.5 | 45.6 | 1.09 | 0.0239 |
| Example 24 | 5.0 | | 16 | 66.2 | 23.9 | 48.0 | 0.81 | 0.0169 |
| Example 25 | 8.5 | | 10 | 68.3 | 23.3 | 48.2 | 0.70 | 0.0145 |
| Example 26 | 7.5 | | 11 | 66.7 | 24.6 | 50.2 | 0.80 | 0.0159 |
| Comparative Example 1 | N/A | N/A | ~1 | 77.4 | 13.5 | 43.7 | 5.51 | 0.1261 |

In Table 8, SP refers to silicone polyoxamide, % T@940 nm refers to percentage transmission at 940 nm wavelength of light, and D refers to depolarization ratio. Data presented above shows that the Comparative Example 1, which is optimized for high IR transmission, has significantly high depolarization ratio as compared to the Examples incorporating the diffusive coating of the present disclosure (Examples 1-26), with a slight decrease (<100%) in specular IR transmission for approximately the same visible haze (e.g., Example 22).

Thus, the optical construction (e.g., the optical construction 200) of the present disclosure (Examples 1-26) exhibits substantially high specular IR transmission (low IR scattering) and substantially high visible haze while maintaining low depolarization. The substantially high specular IR transmission may allow the optical construction of the present disclosure to be used for fingerprint sensing and sufficiently high visible haze may help in eliminating optical artifacts, such as moiré. Additionally, with lower depolarization, the optical construction may preserve the polarization of light exiting the optical construction.

Table 9 below provides optical measurement data for some of the Examples provided above.

TABLE 9

Optical Measurement Data

| Example | Brightness with APF | Brightness without APF | Contrast with APF | Contrast without APF | Moiré with APF | Moiré with Polarizer |
|---|---|---|---|---|---|---|
| Advanced Structured Optical Composite Film | 403.2 | 282.4 | 1609.6 | 1839.74 | — | — |
| Example 25 | 278.4 | 248.7 | 1315.7 | 1354.58 | 1 | 2 |
| Example 22 | 278.8 | 261.8 | 1322 | 1366.39 | 2 | 2 |
| Example 19 | 283.2 | 262.7 | 1321.5 | 1359.03 | 2 | 2 |
| Example 15 | 281 | 259.7 | 1313.1 | 1338.66 | 1 | 1 |
| Example 13 | 280.3 | 258.2 | 1314.7 | 1253.4 | 1 | 1 |
| Uncoated Reflective Polarizer | 266.4 | 271.9 | 1283.2 | 1277.73 | 3 | 3 |
| Comparative Example 1 | 255 | 226 | 1247.6 | 1309.39 | 2 | 3 |
| Reflective polarizer for comparative examples | 274.3 | 266.1 | 1321.3 | 1264.73 | 3 | 3 |

The Advanced Structured Optical Composite film is available from 3M Company, St Paul, MN. Data in Table 9 shows that the reflective polarizer coated with the optical film (i.e., CMOF coated with the diffusive coating) of the present disclosure (Examples 13, 15, 19, 22, 25) yields the same level of brightness without an advanced polarizing filter (APF) as Comparative Example 1 with APF on a display panel while maintaining high IR transmission. Addition of APF with the optical construction of the present disclosure may further enhance the brightness of the display panel. Also, the data presented above shows that moirécan be eliminated by using an optical film (functioning as a diffusive coating) coated on a reflective polarizer with visible haze of about 34%.

Table 10 below provides optical measurement data for some other examples related to the present disclosure.

TABLE 10

Optical Measurement Data

| Example | Haze (%) | D (%) | D/Haze |
|---|---|---|---|
| 1431-010A | 48.1 | 6.33 | 0.1315 |
| 1431-010B | 46.0 | 6.23 | 0.1353 |
| 1431-010C | 49.7 | 5.96 | 0.1200 |
| HT-10 | 35.2 | 0.29 | 0.0084 |
| HT-11 | 37.0 | 0.33 | 0.0090 |
| 1556-005 | 38.8 | 0.34 | 0.0088 |
| HT-15 | 28.7 | 0.21 | 0.0074 |
| HT-16 | 31.2 | 0.21 | 0.0068 |
| HT-17 | 33.4 | 0.26 | 0.0077 |
| HT-18 | 35.4 | 0.28 | 0.0080 |
| HT-19 | 36.9 | 0.29 | 0.0080 |
| HT-20 | 39.1 | 0.32 | 0.0082 |
| HT-21 | 41.1 | 0.37 | 0.0091 |
| HT-22 | 42.8 | 0.39 | 0.0090 |
| HT-39 | 44.8 | 0.42 | 0.0094 |
| HT-40 | 42.5 | 0.36 | 0.0085 |
| HT-41 | 39.9 | 0.32 | 0.0080 |
| HT-42 | 36.4 | 0.31 | 0.0085 |
| HT-43 | 33.5 | 0.28 | 0.0083 |

In Table 10, 1431-010A, 1431-010B and 1431-010C are conventional films provided as Comparative Examples, prepared as described above. HT-10, HT-11, 1556-005, HT-15 to HT-22, HT-39 to HT 43 correspond to Examples prepared based on the present disclosure. These examples were prepared as follows.

Polymer solutions as described above were prepared using the process outlined earlier. In the polymer solution, 0.6 wt. % of acrylic beads (e.g., the second particles 236) available as MX2000, from Soken Engineering and Chemicals Co. Ltd., Japan were added and thoroughly mixed. The final mixture was then coated on S-CMOF film using a solvent coater. The solvents were evaporated by passing a coated web through heated ovens. By adjusting the concentration of silicone polyoxamide in the solutions, different dry thicknesses with several haze levels as shown in table 10 were obtained.

Further, D in Table 10 refers to depolarization ratio. Data provided in Table 10 shows that the Examples prepared based on the present disclosure exhibit significantly lower depolarization ratio while maintaining sufficiently high optical haze. Therefore, a ratio of the depolarization ratio to the optical haze is lower as compared to the conventional films.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:
1. An optical construction comprising:
   a reflective polarizer comprising a first major surface and a second major surface opposite to the first major surface; and
   an optical film disposed on the first major surface of the reflective polarizer, the optical film comprising a matrix and a plurality of first particles dispersed in the matrix, each of the matrix and the plurality of first particles comprising a silicone polyoxamide and an acrylate polymer, such that:

for substantially normally incident light and for at least a first wavelength in a first wavelength range from about 400 nm to about 700 nm, the reflective polarizer reflects at least about 60% of the normally incident light for a first polarization state and transmits at least about 40% of the normally incident light for an orthogonal second polarization state;

for at least a second wavelength in a second wavelength range from about 800 nm to about 1500 nm, each of the reflective polarizer and the optical film transmits at least about 60% of an incident light for each of the first polarization state and the second polarization state; and for at least the first wavelength, the optical film has an optical haze and a depolarization ratio, wherein a ratio of the depolarization ratio to the optical haze is less than about 0.1.

2. The optical construction of claim 1, wherein, for at least the second wavelength, the optical film has a scattering ratio of less than about 30%.

3. The optical construction of claim 1, wherein, for an obliquely incident light having an incident angle of at least about 45 degrees and for at least the first wavelength, the reflective polarizer reflects at least about 60% of the obliquely incident light for each of the first polarization state and the second polarization state.

4. An optical construction comprising:
a reflective polarizer comprising a first major surface and a second major surface opposite to the first major surface; and
an optical film disposed on the first major surface of the reflective polarizer, the optical film comprising a matrix and a plurality of first particles dispersed in the matrix, each of the matrix and the plurality of first particles comprising a silicone polyoxamide and an acrylate polymer, such that:

for substantially normally incident light and for a first wavelength range from about 400 nm to about 700 nm, the reflective polarizer has an average optical reflectance of at least about 60% for a first polarization state and an average optical transmittance of at least about 40% for an orthogonal second polarization state;

for a second wavelength range from about 800 nm to about 1500 nm, the reflective polarizer and the optical film, in combination, have an average optical transmittance of at least about 60% for each of the first polarization state and the second polarization state; and for the first wavelength range, the optical film has an average optical haze and an average depolarization ratio, wherein a ratio of the average depolarization ratio to the average optical haze is less than about 0.1.

5. The optical construction of claim 4, wherein, for each of at least a majority of the first particles, a maximum dimension D1 of the first particle is along a first direction and a maximum dimension of the first particle along an orthogonal second direction is D2, D1 is greater than D2 by at least 10%.

6. An optical film comprising a matrix and a plurality of first particles dispersed in the matrix, each of the matrix and the plurality of first particles comprising a silicone polyoxamide and an acrylate polymer, wherein the first particles comprise more silicon than the matrix, and the matrix comprises more carbon than the first particles, wherein in a cross-section of the optical film, the first particles have a maximum first dimension X1 along a first direction and a maximum second dimension X2 along an orthogonal second direction, and wherein X1 is greater than X2 by at least 10%.

7. The optical film of claim 6, further comprising a plurality of second particles different from the first particles, at least some of the second particles partially protruding from at least one major surface of the optical film.

* * * * *